US008819797B2

(12) United States Patent
Cross et al.

(10) Patent No.: US 8,819,797 B2
(45) Date of Patent: *Aug. 26, 2014

(54) DIGITAL IDENTITY MANAGEMENT

(75) Inventors: David B. Cross, Redmond, WA (US); Matthew W. Thomlinson, Seattle, WA (US); Philip J. Hallin, Port Townsend, WA (US); Thomas C. Jones, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/410,173

(22) Filed: Mar. 1, 2012

(65) Prior Publication Data

US 2012/0174200 A1 Jul. 5, 2012

Related U.S. Application Data

(60) Continuation of application No. 11/552,736, filed on Oct. 25, 2006, now Pat. No. 8,151,332, which is a division of application No. 10/365,878, filed on Feb. 13, 2003, now Pat. No. 7,703,128.

(51) Int. Cl.
*G06F 17/00* (2006.01)
*G06F 7/04* (2006.01)

(52) U.S. Cl.
USPC .................................. 726/6; 726/1

(58) Field of Classification Search
USPC ............. 726/1–10, 16–20, 26–30; 713/150, 713/164–167, 189, 193
See application file for complete search history.

(56) References Cited

U.S. PATENT DOCUMENTS

| 5,341,426 | A | 8/1994 | Barney et al. |
| 5,657,458 | A | 8/1997 | Kondo et al. |
| 5,689,706 | A | 11/1997 | Rao et al. |
| 5,774,545 | A | 6/1998 | Raghavachari |
| 5,838,903 | A | 11/1998 | Blakely, III et al. |
| 5,887,065 | A | 3/1999 | Audebert |
| 5,892,828 | A | 4/1999 | Perlman |
| 5,916,307 | A | 6/1999 | Piskiel et al. |
| 6,014,669 | A | 1/2000 | Slaughter et al. |
| 6,144,959 | A | 11/2000 | Anderson et al. |
| 6,151,643 | A | 11/2000 | Cheng et al. |

(Continued)

FOREIGN PATENT DOCUMENTS

| CA | 2324732 A1 | 4/2002 |
| CN | 1373423 A | 10/2002 |

(Continued)

OTHER PUBLICATIONS

Allen, et al., Single Sign-ON: A Set of Scribe Notes Describing the Operation of Single Sign-ON After a Lecture Given by Almerindo Graziano, retrieved from the internet on Jan. 21, 2011 at <<http://www.besnard.org/sso.pdf>>.

(Continued)

*Primary Examiner* — Darren B Schwartz
(74) *Attorney, Agent, or Firm* — Tony H. Azure; Andrew Sanders; Micky Minhas

(57) ABSTRACT

One aspect relates to a process and associated device for managing digital ID lifecycles for application programs, and abstracting application programs for multiple types of credentials through a common Digital Identity Management System (DIMS) and Application Programming Interface (API) layer.

19 Claims, 15 Drawing Sheets

(56) References Cited

U.S. PATENT DOCUMENTS

| | | | |
|---|---|---|---|
| 6,202,157 B1* | 3/2001 | Brownlie et al. | 726/1 |
| 6,308,273 B1* | 10/2001 | Goertzel et al. | 726/9 |
| 6,351,468 B1 | 2/2002 | LaRowe, Jr. et al. | |
| 6,438,690 B1* | 8/2002 | Patel et al. | 713/156 |
| 6,460,051 B1 | 10/2002 | LaRue et al. | |
| 6,490,666 B1 | 12/2002 | Cabrera et al. | |
| 6,490,680 B1 | 12/2002 | Scheidt et al. | |
| 6,499,110 B1* | 12/2002 | Moses et al. | 726/1 |
| 6,510,522 B1 | 1/2003 | Heinrich et al. | |
| 6,560,655 B1 | 5/2003 | Grambihler et al. | |
| 6,732,277 B1 | 5/2004 | Vandergeest et al. | |
| 6,986,039 B1 | 1/2006 | Leah et al. | |
| 6,993,653 B1 | 1/2006 | Guski et al. | |
| 7,010,683 B2 | 3/2006 | Corella | |
| 7,290,133 B1 | 10/2007 | Montgomery | |
| 7,328,344 B2 | 2/2008 | Chang | |
| 7,363,325 B2 | 4/2008 | Yianilos et al. | |
| 7,703,128 B2* | 4/2010 | Cross et al. | 726/6 |
| 8,151,332 B2* | 4/2012 | Cross et al. | 726/7 |
| 2001/0044894 A1* | 11/2001 | Saito et al. | 713/156 |
| 2002/0013898 A1 | 1/2002 | Sudia et al. | |
| 2002/0027992 A1 | 3/2002 | Matsuyama et al. | |
| 2002/0029214 A1 | 3/2002 | Yianilos et al. | |
| 2002/0087883 A1 | 7/2002 | Wohlgemuth et al. | |
| 2002/0107809 A1 | 8/2002 | Biddle et al. | |
| 2002/0112083 A1 | 8/2002 | Joshi et al. | |
| 2002/0116646 A1* | 8/2002 | Mont et al. | 713/201 |
| 2002/0116647 A1 | 8/2002 | Mont et al. | |
| 2002/0157089 A1 | 10/2002 | Patel et al. | |
| 2002/0178271 A1 | 11/2002 | Graham et al. | |
| 2002/0178377 A1* | 11/2002 | Hemsath et al. | 713/201 |
| 2003/0018785 A1 | 1/2003 | Eshel et al. | |
| 2003/0074660 A1* | 4/2003 | McCormack et al. | 725/2 |
| 2003/0084171 A1 | 5/2003 | de Jong et al. | |
| 2003/0105957 A1 | 6/2003 | Brabson | |
| 2003/0110376 A1 | 6/2003 | Wiener et al. | |
| 2003/0115322 A1* | 6/2003 | Moriconi et al. | 709/224 |
| 2003/0131245 A1* | 7/2003 | Linderman | 713/176 |
| 2003/0163686 A1 | 8/2003 | Ward et al. | |
| 2003/0167405 A1 | 9/2003 | Freund et al. | |
| 2004/0024889 A1 | 2/2004 | Getsin et al. | |
| 2004/0073787 A1 | 4/2004 | Ban et al. | |
| 2004/0123138 A1 | 6/2004 | Le Saint | |
| 2004/0260953 A1 | 12/2004 | Jamieson et al. | |
| 2005/0044089 A1 | 2/2005 | Wu et al. | |
| 2005/0171872 A1 | 8/2005 | Burch et al. | |
| 2006/0069913 A1 | 3/2006 | Valente | |
| 2006/0075472 A1 | 4/2006 | Sanda et al. | |
| 2007/0055887 A1 | 3/2007 | Cross et al. | |
| 2007/0124812 A1* | 5/2007 | Weeks et al. | 726/10 |

FOREIGN PATENT DOCUMENTS

| | | |
|---|---|---|
| EP | 0706291 | 4/1996 |
| EP | 1560100 | 8/2005 |
| JP | 4271462 A | 9/1992 |
| JP | 4271465 A | 9/1992 |
| JP | 2000082045 A | 3/2000 |
| JP | 2001109668 A | 4/2001 |
| JP | 2002132728 | 5/2002 |
| RU | 2148856 C1 | 5/2000 |
| WO | WO9608912 | 3/1996 |
| WO | WO9843426 | 10/1998 |
| WO | WO0052557 A1 | 9/2000 |
| WO | WO0152023 A2 | 7/2001 |

OTHER PUBLICATIONS

"ArcotID Software Smart Card", available at <<http://www.arcot.com/arcotID.html>>, Apr. 2004, 3 pages.

Brovick et al., "Windows 2000 Active Directory", New Riders Publishing, 2000, Chapter 10 pp. 1-8.

Canadian Office Action mailed Aug. 14, 2012 for Canadian patent application No. 2499932, a counterpart foreign application of US patent No. 7,984,488, 3 pages.

Christoffel, Jurgen, "Bal—A Tool to Synchronize Document Collections Between Computers", Proceedings of the Eleventh Systems Administration Conference (LISA 1997), San Diego, California, Oct. 1997, pp. 85-88.

Translated Chinese Office Action mailed Mar. 11, 2011 for Chinese Patent Application No. 200510052746.8, a counterpart foreign application of U.S. Appl. No. 10/821,603.

Cross, "Certificate Autoenrollment in Windows Server 2003", retrieved on Apr. 8, 2004 from <<http://www.microsoft.com/technet/prodtechnol/windowsserver2003/technologies/security . . . >>, Apr. 2003, 31 pages.

"Entrust Authority (tm) Roaming Server", available at <<http://www.entrust.com/authority/roaming/datasheet.htm>>, Apr. 2004, 2 pages.

"Functional Model of a Conditional Access System", EBU Project Group B/CA, EBU Technical Review, Winter 1995, pp. 64-77.

Gupta, et al., "Security Characteristics of Cryptographic Mobility Solutions" retrieved on May 29, 2006 at <<http:"www.cs.dartmouth.edu/{pki02/Gupta/paper.pdf>> Jul. 30, 2002, pp. 117-126.

Gustafson, et al., "Securely Available Credentials—Credential Server Framework", IETF Standard-Working-Draft, Internet Engineering Rask Force, vol. sacred, No. 7, Nov. 2003, pp. 1-22.

Translated Japanese Office Action mailed on Jan. 28, 2011 for Japanese Patent Application No. 2005-55981, a counterpart foreign application of U.S. Appl. No. 10/821,603.

Translated Japanese Office Action mailed Sep. 27, 2011 for Japanese patent application No. 2005-55981, a counterpart foreign application of US patent No. 7,984,488, 3 pages.

Japanese Office Action mailed Sep. 4, 2012 for Japanese patent application No. 2005-55981, a counterpart foreign application of US patent No. 7,984,488, 9 pages.

Korean Office Action mailed Apr. 28, 2011 for Korean Patent Application No. 10-2005-19076, a counterpart foreign application of U.S. Appl. No. 10/821,603.

"Managed PKI: Roaming", available at <<http://www.verisign.com/products/roaming/index.html>>, Apr. 2004, copyright 1995 to 2004, 2 pages.

Nemoto, Novelle Announces a Rule for Consolidating Passwords in an Environment Including a Plurality of Servers, retrieved from the internet on Jan. 21, 2011 at <<http://itpro.nikkeibp.co.jp/free/NT/NEWS/20040318/1>> Mar. 18, 2004.

Novelle Announces Products for Achieving Both Security and Efficiency, retrieved from the internet on Jan. 21, 2011 at <<http://journal.mycom.co.jp.news/2002/05/20/06.html>> May 20, 2002.

"Novell SecureLogin", retrieved on Jun. 29, 2006 at <<http://www.novell.com/documentation/securelogin30/pdfdoc/nsladm304/nsladm304.pdf>>Oct. 31, 2003, Section 1, pp. 1-198.

"Partial containment structure for integration of distributed computing environment and local registries", IBM Technical disclosure bulletin, IBM Corp. New York, US, vol. 38, No. 9, Sep. 1, 1995, pp. 535-538.

"RSA Security Introduces Web-based Digital Credential Store", available at <<http://www.rsasecurity.com/company/news/releases/pr.asp?doc_id=312>>, Apr. 2004, 2 pages.

Shibutani, "Coexistence of Active Directory and NDS, Detailed Explanation: Services for NetWare 5.0", INTEROP Magazine, vol. 10, No. 10, pp. 167-173, Softbank Publishing Inc., Oct. 1, 2000.

Single Sign-ON: Improving Convenience and Reducing Management Burdens for Users in a Secure Sing-ON Environment, retrieved from the internet at <<http://itpro.nikkeibp.co.jp/as/novell-sec/sp1/index.html>> 2003.

Stern, et al., NFS & NIS, 2nd Ed., pp. 72-77, OReilly Japan, Inc., published on Apr. 27, 2002.

Taguchi, Novell Announces a Network-Security Related New Product Novell SecureLogin 3.0, retrieved from the internet on Jan. 21, 2011 at http://ascii.jp.elem/000/000/331/331049/ May 21, 2002.

"v-Go Single-Sign on by Passlogix" retrieved on May 29, 2006 at <<http://www.biometricsdirect.com/Documents/brochure-SSO.pdf>> Passlogix, Apr. 8, 2003, 7 pages.

Yamaguchi, "Visual J++ Becomes Unsuitable for Pure Java, and Restarts as a Win Development Tool", Nikkei Byte, No. 178, pp. 158-163, Nikkei Business Publications, Inc., May 22, 1998.

(56) References Cited

OTHER PUBLICATIONS

Indian Office Action mailed Aug. 2, 2013 for Indian patent application No. 505/DEL/2005, a counterpart foreign application of US patent No. 7,984,488, 2 pages.

Translated Japanese Office Action mailed Oct. 1, 2013 for Japanese patent application No. 2005-55981, a counterpart foreign application of US patent No. 7,984,488, 24 pages.

* cited by examiner

DIGITAL IDENTITY MANAGEMENT

RELATED APPLICATION

This application is a continuation of and claims priority to U.S. patent application Ser. No. 11/552,736, which was filed Nov. 25, 2006, and that is a divisional of, and claims priority to, U.S. patent application Ser. No. 10/363,878, which was filed Feb. 13, 2003, by Cross et al., now U.S. Pat. No. 7,703,128, the disclosure of both being fully incorporated by reference herein.

BACKGROUND

In operating systems and platforms, various technologies exist that relate to managing digital identities such as certificates, identities, tokens, keys, assertions, or credentials. Each developer of application programs often applies their own techniques for managing these certificates, identities, or credentials. Application programs therefore often manage and store their digital identities differently. This variation in techniques for managing the digital identities makes it more difficult for application programs to interface with the credentials. The individual application programs that store or interface with different digital identities often have difficulty interfacing with different types of digital identities associated with the different application programs.

Historically, the operating system and application program developers have protected digital identities using different methods, and have stored the digital identities in different locations. Networking aspects of the application programs make such protection of networked data and programs even more important and challenging since networked application programs typically have to be able to access data from certain prescribed locations. Application programs typically have to be aware of how to obtain data through the protection provided by digital identities, and be able to prove their validity at different locations within the operating system.

SUMMARY

This disclosure relates in general to management of digital identities (IDs). One aspect of this disclosure relates to a method and associated apparatus for managing digital ID lifecycles of digital identities for application programs, and abstracting application programs for multiple types of digital identities through a common digital identity management system (DIMS) and Application Programming Interface (API) layer.

BRIEF DESCRIPTION OF THE DRAWINGS

The same numbers are used throughout the drawings to reference like features and components.

DETAILED DESCRIPTION

Figure 1A:
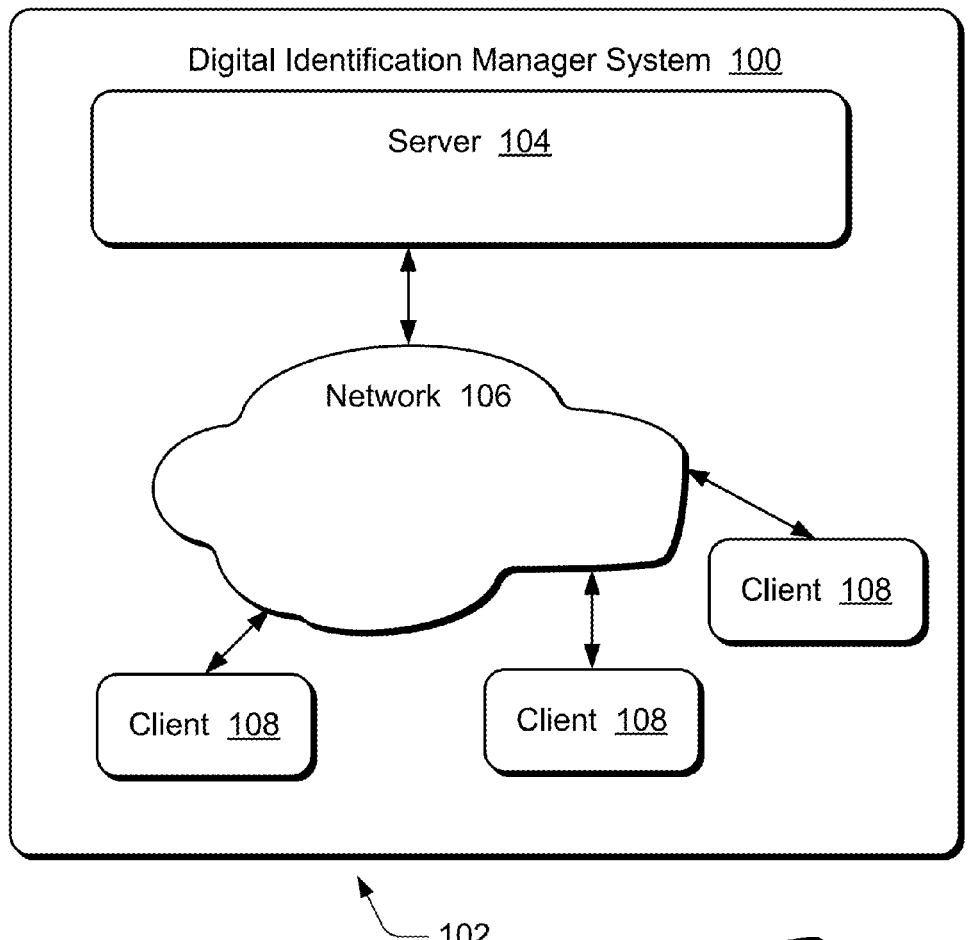
FIG. 1a illustrates a block diagram of one embodiment of a network computer system that is configured as a digital identity management system (DIMS).

The present disclosure relates to techniques that enable users (novice and advanced) to secure their documents, files, e-mail messages, communication sessions, web sessions, etc. and/or collaborate with other individuals such as family members, peers, team members, and business partners in a secure and easy to use manner. Authentication is crucial to secure communications. Users must be able to prove their identity to those with whom they communicate and must be able to verify the identity of others. Authentication of identity on a network is complex because the communicating parties do not physically meet as they communicate. Without authentication or encryption, another person can intercept messages or impersonate another person or entity.

Certain embodiments of digital identities (IDs) and credentials as described herein have attributes associated with them. At a higher level, multiple ones of these credentials or digital IDs can be somewhat interchangeable. Certain credentials and digital IDs have the same associated attributes (such as an e-mail address). Other credentials and digital IDs have different attributes and different expiration dates. The digital IDs include, but are not limited to, key pairs, username and passwords, licenses, assertions, certificates, and the like.

A user name and password associated with a digital ID may (depending on the application program and the associated secrecy) have a useful life of, e.g., several seconds or alternatively many months. Some shorter-lasting digital IDs are used to obtain additional digital IDs having a longer duration or vice versa. The digital ID (such as a certificate) and key pair may have a useful life of, e.g., 180 days. As such, there exist a wide variety of digital IDs. Digital IDs allow one or more users to securely use a variety of their application programs. Digital IDs also allow a plurality of users to communicate securely.

In one embodiment, a digital ID, such as a certificate, is a set of data that identifies an entity. Another embodiment is a digital ID that is an assertion or a set of claims regarding that identity. A trusted organization can assign a digital ID to an individual or an entity that associates a key or a set of claims with the individual. The individual or entity to whom the digital ID is issued is called the subject of that digital ID. The trusted organization (sometimes known as a trusted third party) that issues the digital ID is in different embodiments a security token service (STS), a Certification Authority (CA), or a key distribution authority such as a Kerberos key distribution center (KDC). The trusted organization is considered the digital ID's issuer. Certain embodiments of the STS include a CA, a key distribution center, a license server, or other trusted source that distributes digital IDs. A trusted organization such as the STS will only issue a digital ID after verifying the identity of the digital ID's subject.

The digital ID is a data structure that can be stored in a relational database, a flat database, files system, key device, or other computer memory device. One embodiment of the digital ID is described relative to FIG. 6. The digital ID store(s) data relating to the identity of a particular user (such as certificates for a user and/or a key pair).

There are a large variety of digital ID management systems (DIMS) 100 that are described in this disclosure. In general, DIMS 100 provide processes for application programs to perform authentication, authorization, encryption, and decryption using digital IDs. Many embodiments of DIMS are configured to perform credential management. Within this disclosure, a digital identity management system (DIMS) 100 refers to any system that manages one or more digital IDs. Digital IDs include such identities as certificates, credentials, tokens, assertions, claims, and key pairs.

Figure 2:
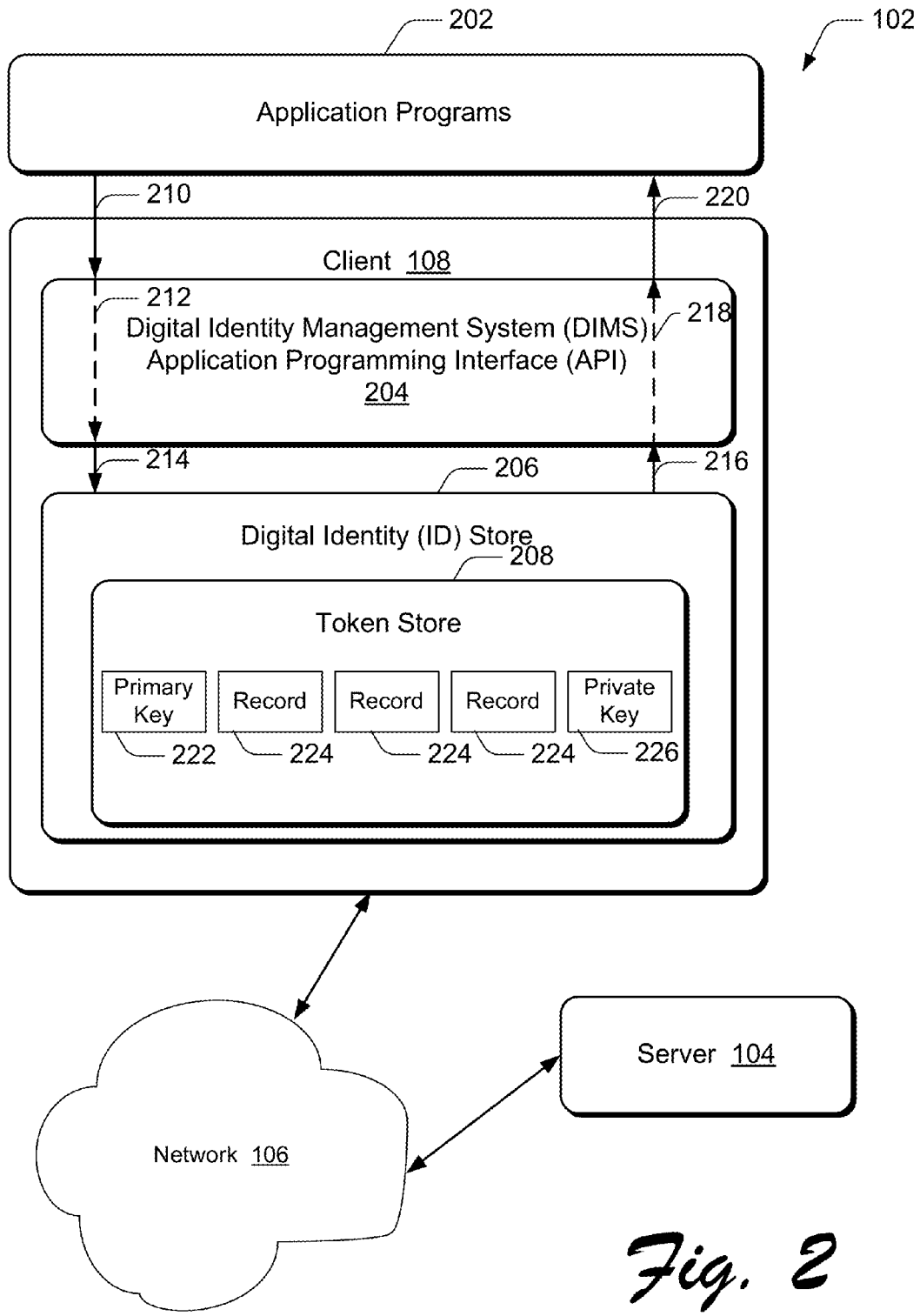
FIG. 2 illustrates one embodiment of the DIMS containing the digital identity (ID) such as can be managed by the DIMS.

Certain embodiments of the DIMS 100, as described within the disclosure, manage such digital IDs as certificates that are used for data encryption and decryption in a variety of application programs. For example, the DIMS 100 could store their validity periods and indicate where the digital IDs originated so that the DIMS can manage the digital IDs on behalf of the user (or on behalf of an application program 202 as shown in FIG. 2). As such, the DIMS 100 is aware of the status of the various digital IDs, and acts on behalf of the digital IDs so that the contained information is constantly fresh or serviceable to the application programs and to the user.

A user should be able to create a digital ID on demand by going to a user interface such as a management console, and following the user interface prompts. The management console should provide the user interface to the DIMS. The generation of the digital ID should be easy to perform and seamless. The user interface may provide the user options to activate a key device such as a smartcard and smartcard reader. The management console could even prompt the user as to whether they want to associate their smartcard with a prescribed application program account to provide a secure login. The DIMS should be able to generate a self-signed digital ID (such as a certificate) for all purposes on such key devices as smartcard readers.

The DIMS 100 manages the generation of the digital ID data structures. Users of the DIMS 100 only have to be concerned with whether they have a digital ID, where they can obtain a digital ID (the DIMS may help the user identify sources on the network or Internet that can provide digital ID services), and what uses there are for the digital ID. If they so choose, only advanced users, system managers, and troubleshooters have to focus on such encryption concepts as Public Key Infrastructure (PM), certificates, certificate chains, trusts, or other authentication specifics. Such encryption concepts are often complex, confusing, and difficult for many typical users to properly and effectively implement and use. For example, the usage of many embodiments of virtual public networks (VPN) have decreased largely due to the difficulties in effectively managing the digital IDs.

Small businesses, large businesses, organizations, and even individuals can easily sign up for managed services for PKI and DRM scenarios using the DIMS 100. Alignment with web services, WS-Security, DRM and XRML license store(s) will enable DRM (Digital Rights Management) scenarios for content control within the DIMS, as discussed in more detail below.

The DIMS 100 can run on a variety of networked computer and stand-alone computer configurations. For example, FIG. 1a illustrates one embodiment of computer environment 102 including one or more servers 104, a network 106, and one or more clients 108 that are arranged in a network configuration. The embodiment of DIMS 100 shown in FIG. 1a provides data communications between different instances of the client computers 108 and/or the server computers 104. In this disclosure, the client computers 108 are referred to as being configured as "domain-joined" computers. The clients 108 and the servers 104 may be configured as distinct computers, networked workstations, mainframes, embedded devices, or physically small computing devices such as a PDA or cellular telephone arranged in a local area network (LAN), wide area network (WAN), wireless, wired-base, or other networked configuration.

Figure 1B:
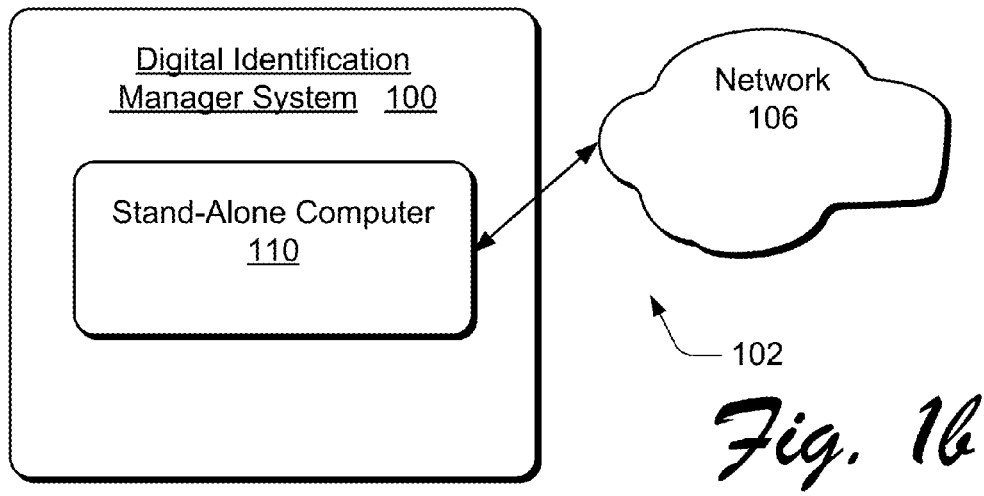
FIG. 1b illustrates a block diagram of one embodiment of a stand-alone computer system that is configured within the DIMS.
Figure 13:
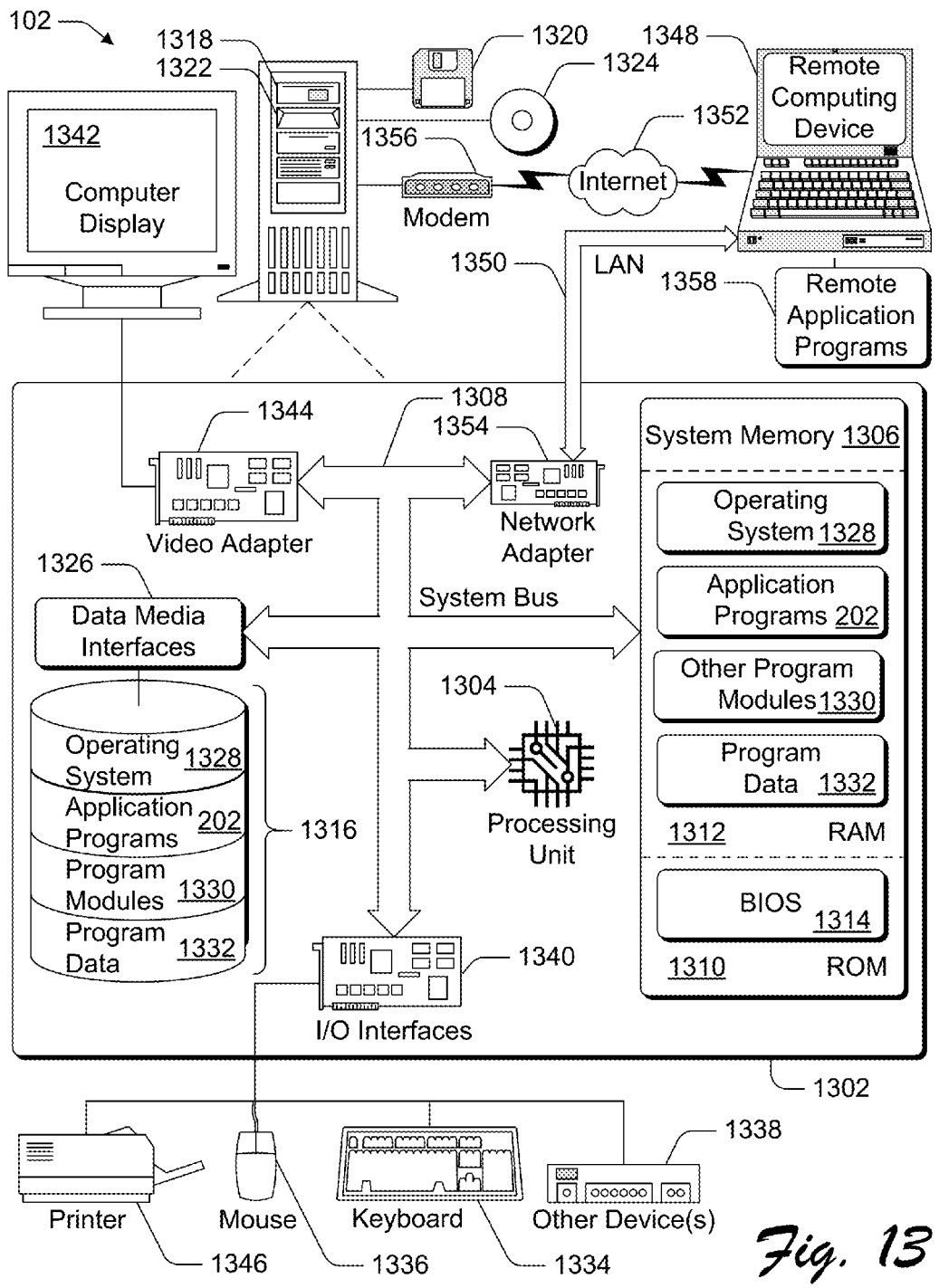
FIG. 13 illustrates one embodiment of a computer environment such as can run the DIMS.

FIG. 1b illustrates another embodiment of DIMS 100 that runs on a stand-alone computer 110, which is in communication with the network 106 (often over the Internet). The stand-alone computer configuration can be viewed as a small or large computer environment 102. For example, the stand-alone computer 110 could be a personal computer, an embedded computer device, a mainframe, or a PDA. In this disclosure, the stand-alone computer 110 is referred to as being configured as a "non-domain joined" computer. The digital ID and encryption concepts of the DIMS 100 can be applied to computer environments 102 of any size or complexity such as shown in FIGS. 1a, 1b, and 13.

Not all users have access to enterprise network, WAN, or LAN services. Those computers that are connected to such networks as enterprise networks, LANs, and WANs are referred to as domain-joined computers. Those computers that are not connected to enterprise networks, LANs, and WANs (but are instead connected to the Internet) are described as non-domain joined computers. As described in this disclosure, certain embodiments of the DIMS provide different security services for domain-joined computers and non-domain joined computers.

The DIMS 100 can be applied to both domain-joined computers and non-domain joined computers. When the computer is domain joined, all policy is obtained from a central repository such as a directory, database, server (or in one embodiment the Active Directory published by Microsoft Corporation). When the computer is not joined to a domain, DIMS will look for local policy for enrollment or renewal guidance. In one embodiment, non-domain joined computers rely on a life cycle management policy that exists in that computer while domain-joined computers are configured as clients that rely on life cycle management policy that exists in the server. The auto-enrollment is active when the computer is non-domain joined, or when the computer is domain joined and the policy is from the domain. The policy may include configuration rules or process instructions to be followed by the DIMS.

Figure 3:
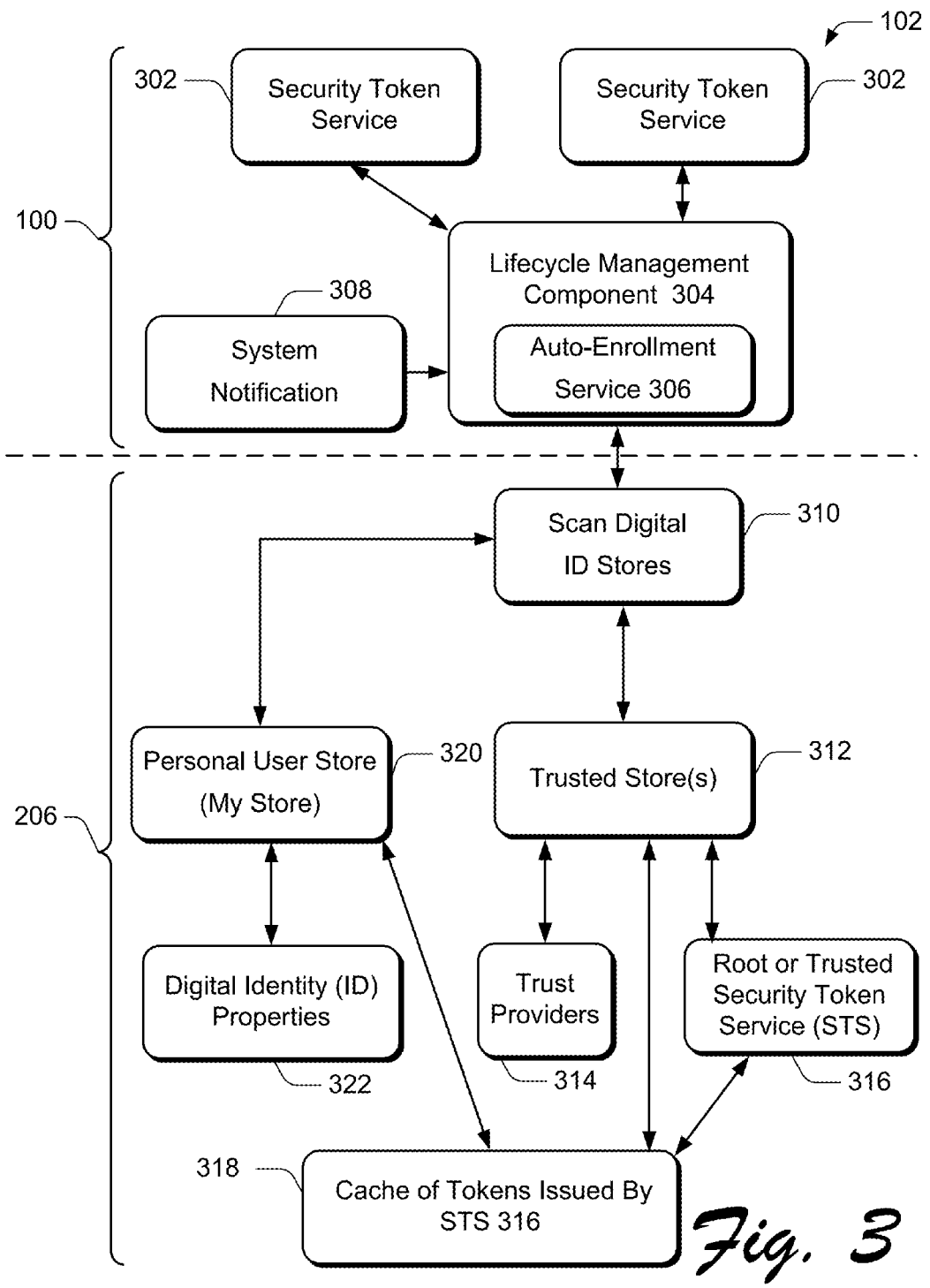
FIG. 3 illustrates a block diagram of one embodiment of the DIMS.

When a user account is created and the user first logs on, a new digital ID is created for that local user in certain embodiments of DIMS 100. The digital ID is a multi-purpose data structure that can be applied to many application programs. A digital ID can be immediately added to a trusted store 312 of the computer as shown in FIG. 3. The trusted store 312 can be provided on all non-domain joined computers and domain-joined computers. A personal user store 320 is also provided on all non-domain joined computers and all domain-joined computers. Both the personal user store 320 of a user and the trusted store 312 of a user can be serviced by the DIMS in slightly different ways, as described in this disclosure. Both the personal user store 320 of a user and the trusted store 312 of a user are included within the digital ID store(s) 206 illustrated in FIG. 2.

Most current users have too many digital IDs for them to effectively use and/or manage. For most users, one or two digital IDs are acceptable to provide effectively secured communications. Having more digital IDs can lead to difficulty and confusion for the user. The more digital IDs that users have, the harder time the users and the application programs have in discerning which digital ID they should use. Today, certain users have public key certificates for each application program such as e-mail, client authorization, and encrypting file system (EFS).

Typically, users can understand such security concepts as "I can encrypt", "I can sign", and "I can authenticate". The DIMS 100 keeps the user interface with digital IDs at this relatively simple level to allow the majority of users to be able to interface, and to provide the users an understanding of what security actions they are performing. One useful technique is to use fewer enhanced key usage (EKU) concepts, and use more key usage concepts. Another technique is to use larger digital ID key sizes with longer lifetimes.

One aspect of certain embodiments of DIMS is the capability to map between digital IDs and their purpose in the application programs so the application programs do not have to provide the complex logic to determine which digital ID to use. As such, application program developers do not have to focus on the complexities of the digital IDs to provide internal security for their application programs. In addition, since DIMS manages the digital identities, a controllable and a discernible amount of security can be provided to the application programs by even those application program developers that do not have experience and/or exposure to digital IDs.

Users should be aware of when they receive a digital ID or when they generate a key. The digital ID may be considered as devalued because certain users have many digital IDs such as keys and certificates. If a higher value is placed on digital IDs, users will be able to understand and use each one of them in more application programs. The DIMS provides an indication to the user of the number of digital IDs that they personally possess, and can monitor to the user whether they should discard certain digital IDs, and/or use certain digital IDs for more than one application program. User digital ID generation, user digital ID use, and access can each be an auditable event within the DIMS 100. Security organizations can determine when a user receives a digital ID, backs up a digital ID, restores a digital ID, or uses a digital ID.

In one embodiment, the DIMS 100 runs as a traditional operating system service, and may be managed as a traditional service in the service component of the operating system architecture. The DIMS 100 can be managed through centralized policy to reduce conflicts with third party communications. One embodiment of this management would be in the group policy capabilities in the active directory and/or such operating systems as the Windows Server 2003® operating system. The DIMS 100 may be triggered by automatic or manual events (for example a logon notification, a group policy pulse, a network notification, or a connection manager triggers such as exist in certain Windows® operating systems. As such, different embodiments of DIMS 100 are provided by which users do not have to manage their digital IDs manually.

FIG. 2 shows one embodiment of computer environment 102 including a client computer. The client computer may be the client (domain-joined) computer 108 as shown in FIG. 1a or the stand-alone (non-domain joined) computer 110 as shown in FIG. 1b. The client computer 108 includes an Application Programming Interface (API) 204 for the DIMS 100 and a digital ID store(s) 206. The digital ID store(s) 206 can include a database (different embodiments of which include a relational database) or some other memory storage configuration. More components relating to the digital ID store(s) 206 are described relative to FIG. 7.

Application programs 202 are shown as an additional component to the client computer 108 as a portion of the computer environment 102. The application programs 202 may, however, be either integrated as a portion of the client computer 108, or alternatively accessible by the client computer.

A variety of communications can exist between the application programs 202, the DIMS 100, and the digital ID store(s) 206 that involve the DIMS. These communications include communications 210, 212, and 214 from the application program 202 via the DIMS API 100, and to the digital ID store(s) 206 by which the application programs request that certain operations be performed on digital IDs. Different embodiments of the communications 210, 212, and 214 are configured to perform find, open, delete, modify operations on the credentials, as well as provide handles to credentials for usage by security systems, application programs, etc.

Figure 5:
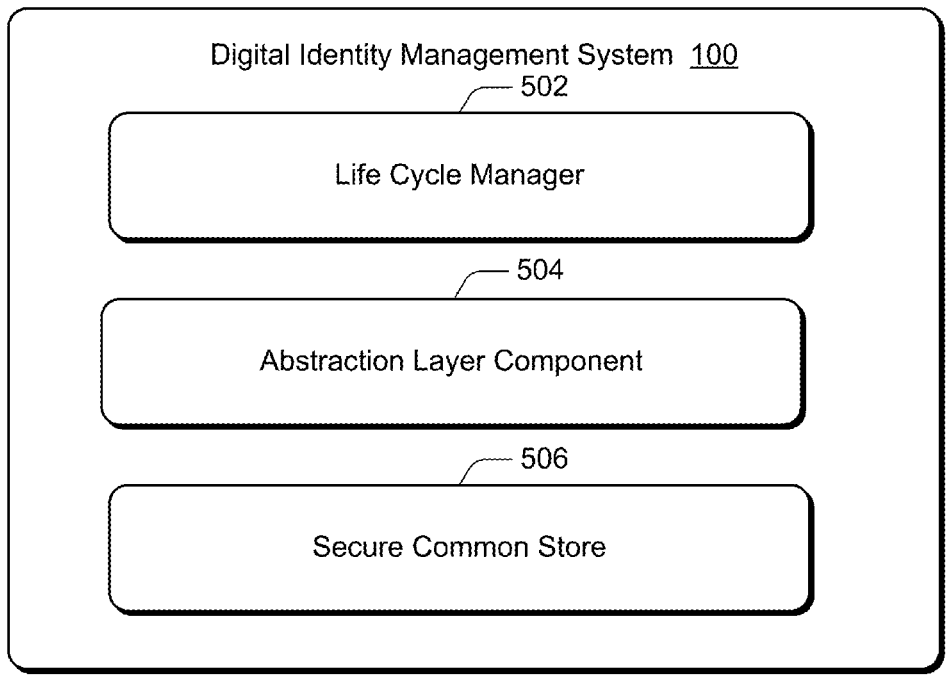
FIG. 5 illustrates a block diagram of one embodiment of the DIMS.

Communications 216, 218, and 220 are generated in response to communications 210, 212, and 214. Communications 216, 218, and 220 act to return a handle from the digital ID store(s) 206 (via the DIMS API 100) to the application program 202 that indicates the operation has been performed. Using the communications 210, 212, 214, 216, 218, and 220 (or some other embodiment of communications) application programs 202 can perform such lifecycle functions on the digital IDs as finding, opening, deleting, and modifying credentials. Such lifecycle functions include an abstraction layer to various token stores as shown in FIG. 5.

Over a period of time, digital IDs have the tendency to accumulate on a user's computer. The DIMS represents tools or mechanisms that are required to manage these digital IDs. The DIMS includes such API functions as storing, retrieving, deleting, listing (enumerating), and verifying digital IDs.

In one embodiment, the DIMS 100 provides two main categories of functions to manage the digital IDs: functions that manage digital ID store(s), and those that work with the digital IDs within those digital ID store(s). The functions that manage digital ID store(s) 206 include functions for working with logical or virtual stores, remote stores, external stores, and relocatable stores.

Digital IDs can be kept and maintained in the digital ID store(s) 206. Digital IDs can be retrieved from the digital ID store(s) 206 where they have been requested for use in authentication, digital signature, encryption/decryption processes, etc. The digital ID store(s) 206 is central to all credential functionality. In one embodiment, the digital ID store(s) 206 is a linked list of certificates in which:

Each digital ID store 206 has a pointer to a first digital ID block in that store.

A digital ID block includes a pointer to that digital ID's data and a "next" pointer to the next digital ID block in the store.

The "next" pointer in the last digital ID block is set to NULL.

The data block of the digital ID contains the read-only digital ID context and any extended properties of the digital ID.

The data block of each digital ID contains a reference count that keeps track of the number of pointers to the digital ID that exist.

In certain embodiments, digital IDs are normally kept in some kind of permanent storage such as a database, disk file or the system registry in the digital ID store(s) 206. The digital ID store(s) 206 can also be created and opened in a memory (or in a virtual memory) such as provided by such a key device as a smartcard reader. In certain embodiments, a memory store provides temporary digital ID storage for working with digital IDs that do not need to be persisted. Additional store locations allow stores to be kept and searched in various parts of a local computer's registry. Alternatively, with proper permissions set, the stores can be maintained in the registry of a remote computer.

In one embodiment, each user has a personal user store 320 (called My Store in computers running certain Windows® Operating Systems) where that user's digital IDs are stored. The personal user store 320 can be at any one of many physical locations, including the registry on a local or remote computer, a disk file, a database, directory service, a smart card, or another location. While any digital ID can be stored in the personal digital ID store(s), this store should be reserved for a user's personal digital IDs, particularly those digital IDs used for signing and decrypting that user's messages.

An Application Program Interface (API) 204 as shown in FIG. 2 can request access to a credential. During the calling down through the API 204, the API uses the query, write, modify, create, or delete commands to perform actions on the credentials. A handle or returned token from the API 204 services all requests from application programs 202 generically and securely. The user can request to enumerate or open a credential, delete a credential, create a new credential, and other basic management tasks. It is beneficial for the DIMS 100 to be configured very generically, and be able to return credentials or handles to credentials having various attributes.

The embodiment of digital ID store(s) 206 shown in FIG. 2 includes a token store 208. The token store 208 includes one or more digital IDs 600 including a primary key 222, one or more records 224, and a private key 226. Another embodiment of the digital ID 600 is described in this disclosure relative to FIG. 6.

FIG. 3 shows one embodiment of software components associated with the DIMS 100 (that runs on a computer environment 102 as described relative to FIG. 13, different embodiment of which are shown in FIGS. 1a and 1b). The DIMS 100 may include one or more security token services 302 such as a certificate authority, a lifecycle management component 304 including an auto-enrollment service 306, a system notification portion 308, a digital ID manager component 310, a trusted store 312, a trust provider 314, a root or trusted STS 316, a cache of tokens 318 issued from the root or trusted STS 316, a personal user store 320, and a digital IDs property portion 322.

The lifecycle management component 304 manages the lifecycle processes (i.e., creating, deleting) of digital IDs. As such, certain embodiments of the DIMS 100 includes the lifecycle management component 304 that further includes the auto-enrollment service 306 to perform such aspects of lifecycle management on digital IDs as enrollment, renewal, housekeeping, backup, archival, recovery, etc. Using the auto-enrollment process, organizations can mange the digital ID lifecycles for their users and employees. The DIMS 100 can provide lifecycle management for digital IDs without interaction from the user or the application program.

The digital ID manager component 310, the trusted store 312, the trust provider 314, the root or trusted STS 316, the cache of tokens 318 issued by the root or trusted STS 316, the personal user store 320, and the digital ID properties 322 together provide the functions of storing, retrieving, and modifying data structures and other digital IDs for the auto-encryption process. Within different embodiments of the DIMS, each individual one of the security token services 302, the lifecycle management component 304 including the auto-enrollment service 306, the system notification portion 308, the digital ID manager component 310, the trusted store 312, the trust provider 314, the root or trusted STS 316, the root or trusted STS 316, the cache of tokens 318 issued by the root or trusted STS 316, the personal user store 320, and the digital ID properties 322 can be located in different locations among the client 108, the network 106, or the server 104 as shown in FIG. 1a, or in the stand-alone computer 110 shown in FIG. 1b. In other words, the DIMS 100 can be configured to run on a computer in any networked domain-joined or any stand-alone non-domain joined configuration that is desired.

The system notification component 308 provides an indication of user input, changes in system configuration, and other such features that would be useful for the operation of the DIMS 100. The Security Token Services 302 are trusted sources of such digital IDs as the certificates or tokens for the user (in this case the client computer or the stand-alone computer that is connected to a network).

The digital ID manager component 310 is able to obtain digital IDs from one or more of the components 312, 314, 316, 318, 320, and 322 to provide for the auto-enrollment service 306.

The cache of tokens 318 issued from the root or trusted STS 316 includes one or more cached security tokens such as root x.509 certificate authority certificates that are in persisted in the trusted store 312. In one embodiment, the cache of tokens 318 issued from the root or trusted STS 316 is configured as a pointer to an STS. The personal user store (e.g., "My Store" in certain Windows® Operating Systems) is accessible on many user client operating systems. The digital ID properties define the status of many digital ID parameters.

The trust providers 314 is considered to be a trusted third party (like the cache of tokens 318 issued from the root or trusted STS 316) that provides a trust anchor, trust decisions, or trust information to the user. As such, the DIMS 100 can interact with central services such as the STS 316 to obtain, renew, archive, or recover digital IDs.

Trust management is a difficult to understand concept in PKI. Home users and few technical users understand PM and even fewer understand all of the ramifications of how the PM trust is, and should be, managed. As such, the use of prior digital IDs were often confusing to novice users. Certain embodiments of DIMS 100 will be expanded to alleviate the issues associated with the PKI trust.

In one embodiment, the DIMS 100 can be configured to operate in one of three modes, simple trust, managed trust, and enterprise trust. These three trust models are described.

The Simple Trust model is designed to apply to home users that are not connected to any managed services. Computers that are installed and not joined to a domain use the simple trust model. The simple trust model is used, for example, in the Hotmail® web-based e-mail service and MSN® Messenger today. The client 108 automatically obtains public root x.509 certificate trust from the operating system.

In one embodiment, when an e-mail application program encounters a signature on an e-mail that does not chain to a trusted root security token (can be service) or has not been previously trusted, the client will invoke a simple user interface (UI) asking the user whether they would like to add another user to their "Trusted User List". When a contact and their digital IDs are added to the "Trusted User List", the user digital ID is added to the Trusted People store 312 as shown in FIG. 3. This will allow digital IDs to be validated for a user without complex chain building and trust management for computers that are installed and not joined to a domain, but which are required by the computers attached to certain enterprise networks, LANs, or WANs.

Through the simple trust, application programs that do not call a program to yield the digital ID or certificate chain (i.e., CertGetCertificateChain, which is available in the Cryptographic API from Microsoft Corporation) should now be able to do so. This model can be utilized for a PKI trust. When a user is trusted for one application program such as signed mail, they should also be trusted for other application programs.

The DIMS 100 unifies the trust placed in the user's contacts in the address book with the trust placed in x.509 root certificates, user digital IDs, XML trust stores, DRM license stores, etc. When a user adds another user to their contacts, the first user has established a level of trust with that second user, and the first user should be able to unify the PM trust at the same time. The first user should not have to configure trust multiple times. Application programs also do not need to search for trust policy in multiple locations.

If a first user receives E-mail from a second user multiple times using a prescribed E-mail address, and the E-mail contains the same signing digital IDs each time, a level of trust is established with that user. Some assumptions for the home user can be made if the digital ID is from a particular second user, and the first user can explicitly trust that second user. Once the first user can explicitly trust the second user based on the digital ID, the first user can now make rules based on that trust. For example, the first user can choose to block mail from other (untrusted) users based on signed mail, etc. The system therefore provides the trust decisions through the user for the application programs.

The Managed Trust model is designed to apply to home or small business users that are connected to a managed service (like Microsoft Office® or .NET® service). The Managed Trust model is a hybrid of the Enterprise Trust model and the Simple Trust model. The Managed Trust model can be considered an installable revocation provider model so that a client may enlist in certain networked services to receive trust information. This would ideally be provided as an installable XML Key Management Specification (XKMS) or web services (WS-Security) client component that allows a user to enlist in a service that will provide revocation and trust information to the client. When a signature or digital ID validation request is presented, the client 108 will contact the XKMS service to return the trust information. This assumes the client is always online and connected to the Internet.

Ideally, services like .NET Passport® can provide the very basic model of simple trust through the Windows® Update root program. In certain embodiments, services like .NET Passport® can provide an extended cross-digital ID program having federated corporations and other PM hierarchies so that they may be simply trusted by the user as part of authenticating to .NET Passport. Different embodiments of DIMS 100 can provide a combined root security token service, trust management, and XKMS style trust management all in one. Alternatively, a managed trust can be provided through the active directory and the group policy for domain joined computers.

The Enterprise Trust model is intended to apply to corporate or business users operating computers that belong to an active directory environment. The Enterprise Trust model is maintained as defined in certain embodiments of operating systems, such as Microsoft Windows®.NET. When a client is joined to a domain, the trust model is distributed and maintained by the domain. With the Enterprise Trust model, the DIMS is located primarily at the server 104 as shown in FIG. 1. In one embodiment, when DIMS exists on the server, the server can provide digital IDs and trust information across many machines simultaneously and in a consistent manner. A plurality of computers can be provided with a group identity and the DIMS can be configured to manage the digital identities for either the group identity or the individual identities. The DIMS, (utilizing such policies as provided by Microsoft Windows® 2000 Group Policy) will distribute trusted roots as well as digital ID usage policies to the client and application programs. The enterprise trust model, as in Windows®.NET will allow the option to control user individual trust as well.

The Enterprise Trust model should also allow connection to a managed trust model provider when the enterprise trust model cannot provide an answer for a given digital ID or signature validation. The client can be configured to contact the Managed Trust provider by default or as a fallback option.

The auto-enrollment service 306 of the lifecycle management component 304 acts to automatically provide important digital IDs to the user. This applies to the Simple Trust Model, the Managed Trust Model, and the Enterprise Trust Model embodiments of the DIMS 100. In non-domain joined computers, the auto-enrollment process is performed by a background process during runtime. One embodiment of the auto-enrollment process will follow this order:

The auto-enrollment process understands policy (what should a user have);

The auto-enrollment process verifies validity of what the user has;

The auto-enrollment process does a gap analysis against what the user should and does have (this analysis is already requested and pending issuance);

The auto-enrollment process uses a template to create a request for digital IDs to fill that gap;

The auto-enrollment process makes a request to issuers; and

The auto-enrollment process retrieves any subsequently issued (or previously pending) digital IDs.

The embodiment of digital ID store(s) 206 illustrated in FIG. 2 corresponds to the combination of the digital ID manager component 310, the trusted store 312, the trust providers 314, the cache of tokens 318 issued from the root or trusted STS 316, the personal user store 320, and the digital ID properties 322 as shown in FIG. 3.

The client computer 108 shown in FIG. 2 will support direct use of a key store that is separate from the digital ID store(s) 206. The DIMS 100 can support raw key stores as digital IDs without being associated with x.509 certificates, XML licenses, etc.

The DIMS 100 provides a mechanism by which a user's digital IDs can be renewed as shown relative to FIG. 3. The auto-enrollment service 306 of the lifecycle management component 304 receives system notification 308 that the user's digital ID is to be renewed. The auto-enrollment service 306 enumerates (lists) the personal user store 320 of the user through the digital ID manager component 310. The auto-enrollment service 306 detects expiration, revocation, or possible security token services 302 policy status. The security token service 302 policy check would be to support superceding of the digital IDs.

In one embodiment, the auto-enrollment service 306 of the lifecycle management component 304 then determines whether renewal of the digital ID is necessary. The auto-enrollment service 306 contacts the security token service 302 by finding property on the digital ID. The auto-enrollment service 306 enumerates the security token service 302 for the latest information that can be used to renew the digital ID. The auto-enrollment service 306 then authenticates the user, following which the auto-enrollment 306 performs the renewal of the digital ID.

The DIMS 100 provides a mechanism for trust discovery in non-domain joined computers as described relative to FIG. 3. The DIMS 100 receives system notification 308 requesting the auto-enrollment component 306 of the lifecycle management component 304 to perform trust discovery. The auto-enrollment service 306 enumerates trust providers 314. The auto-enrollment service contacts the trust provider 314 requesting updated information. The trust provider thereupon provides the updated information that is received by the auto-enrollment service 306.

Auto-enrollment of user digital IDs provides a quick and simple technique to issue digital IDs to users, and to enable PKI application programs (including smartcard logon, encrypting file system (EFS), SSL, and S/MIME). SSL and S/MIME are considered to be general purpose encryption protocols because they do not place any limits on the size of the data being encrypted. Though the auto-enrollment service 306 of the lifecycle management component 304 can be located in any location in a network or stand-alone computer environment 102 as shown in FIG. 1b, the present disclosure describes providing the auto-enrollment service 306 within the client computer 108.

The DIMS 100 can focus on secrecy as well as authentication. Consider when a user wants to log on to a server to get, for example E-mail. The user can log on and be authenticated by, e.g., the DIMS 100 by providing a password. If a user has a key device such as a smartcard, the user can use the key device as long as the application program knows how to interface with, and use, that key device. As such, the DIMS 100 has to provide the application program with an interface to interact with, and utilize, the key device. Additionally, the DIMS 100 is renewed separate from when the user retypes the password and login when the DIMS 100 gets a new digital ID and authentication.

Some of the credentials and the digital IDs have to be renewed within the DIMS 100, which is related to the life cycle of the credentials and the digital IDs. A user name or password may have to be renewed or changed. The life cycle manager 502 of the DIMS 100 can manage the life cycle of the credentials and the digital IDs.

A windows-based operating system such as one of the Windows® operating systems (produced and distributed by Microsoft Corporation), loaded within the client computer 108, can include DIMS 100 software providing the auto-enrollment service 306. Providing the DIMS auto-enrollment service 306 within the client computer 108 allows the operating system to control the generation of, and the use of, the digital IDs to be used by that user. User auto-enrollment reduces the cost of normal PKI deployments and reduces the total cost of ownership for a PM implementation by reducing the amount of digital ID management that requires human support involvement.

Additionally, user auto-enrollment increases the control that the users have over the security of their data communications, and their stored data. Both domain joined and non-domain joined computers can utilize auto-enrollment, but the auto-enrollment is typically configured differently for domain joined and non-domain joined computers. The DIMS 100 can be applied to different embodiments of computers 1302 including non-domain joined computers 110 as well as domain joined computers 108. Non-domain joined computers 110 may participate in auto-enrollment and renewal of the digital IDs by providing a structure to store security token service (STS) 302 enrollment information that the auto-enrollment service 306 may use as described relative to FIG. 3. The structure would only contain a list of Security Token Services 302 by their domain name service (DNS) name, port number (optional) and template name(s) or profiles for that STS. In one embodiment, this information would be stored in some location in the computer memory, file system, database, system policy store, etc. with a Security Token Service key for each STS to query and a value for template names. Various configuration services for internet service providers (ISPs) can configure this information.

In one aspect, the auto-enrollment service 306 of the lifecycle management component 304 will attempt enrollment for the templates listed as available to the Security Token Services 302 if the user or computer does not have a digital ID corresponding to the template name(s). The auto-enrollment service 306 contacts each Security Token Services 302 with a request for a template to ask the Security Token Service 302 for the specified template. The auto-enrollment service 306 will use the template information to generate the key, format the request and submit the message, etc. If the attempt to get a template fails, the auto-enrollment service 306 will log an error. Renewal through the auto-enrollment service 306 will examine any template and information from the Security Token Service(s) 302 that may be stored and compare to existing digital IDs requiring renewal. If a digital ID matches one associated with one of the Security Token Services 302 defined in the registry, the auto-enrollment service 306 will attempt to use information provided with the template to refresh the renewal information.

The concept behind auto-enrollment of a user's digital ID such as managed by the DIMS 100 is independent of cryptographic technologies, which may include, within the scope of the present invention and without limitation, RSA algorithms, the Diffie-Hellman algorithms and any other encryption algorithm. Delivery of the digital IDs such as certificates, key pairs, and credentials may be provided under any format, including, again without limitation, the formats of X.509 (and its versions), General Certificates (GC), Public Key Infrastructure (PM), Simple Public Key Infrastructure (SPKI), XML Key Management Specification (XKMS) etc. Any applicable protocol may be employed in practice of the present invention, including, by way of example, such protocols as Hypertext Transport Protocol (HTTP), Multiple Internet Mail Exchange (MIME), S/MIME, Simple Mail Transfer Protocol (SMTP), SET, SOAP, web services, WS-Security, XKMS, etc., such protocols referring to a part, or the whole, of a communication session.

One embodiment of DIMS 100 can be used in governmental and health-care application programs that mandate rigid privacy and data protection controls for personal data, such as data associated with the Health Insurance Portability and Accountability Act (HIPAA). EFS and S/MIME are platform solutions that can utilize the DIMS 100 to help customers meet their data protection requirements without building complex and difficult to use infrastructures.

The DIMS 100 includes the lifecycle management component 304 (which in turn includes the auto-enrollment service 306). The auto-enrollment service 306 supports pending digital ID requests such as those that must undergo registration authority or workflow processes before issuance. For the digital ID requests, a user of the DIMS 100 can manually or automatically request a digital ID from a security token services 302 located at a server 104 (see FIG. 1a) or another network or stand-alone location. Once the digital ID has been approved or issued, the auto-enrollment process 402 will install the digital ID into the users client computer automatically. The auto-enrollment system 306 also supports renewal of an expired user digital ID. Digital IDs are automatically renewed on behalf of the user, machine or application service depending on the configuration of the digital ID template.

The DIMS 100 performs lifecycle management of the digital IDs that allows for digital ID renewal, superseding of digital IDs, and multiple signature requirements. In one embodiment, auto-enrollment can occur in certain DIMS 100 embodiments except where the user interaction is explicitly defined (for example, in a digital ID template in the active directory). The auto-enrollment process 402 is triggered, for example, by the local or interactive logon process. The operating system (within the client computer 108) queries the central repository or possibly the active directory to download a digital ID from the appropriate digital ID store(s) 206 (such as the trusted store 312 shown in FIG. 3) into the personal user store 320 (such as "My Store" that exists in certain embodiments of the Windows® Operating Systems) on the client computer 108. The digital ID properties 322 are under the control of, and can largely be set by, the user in the client computer 108 in FIG. 1*a* or the stand-alone computer 110 shown in FIG. 1*b*.

Figure 4A:
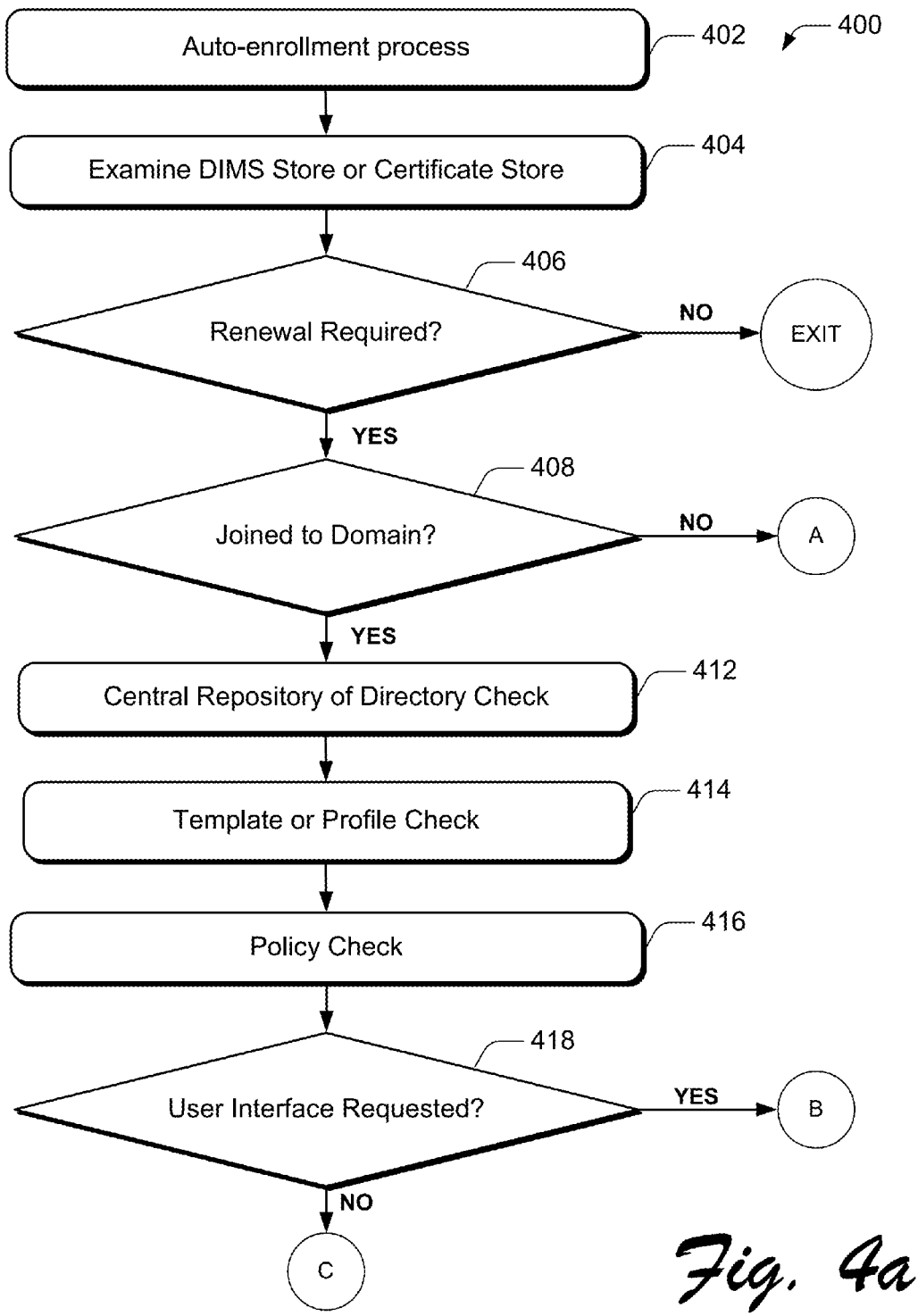
FIGS. 4a, 4b, and 4c illustrate one embodiment of the digital information management process to be performed by certain DIMS.
Figure 4B:
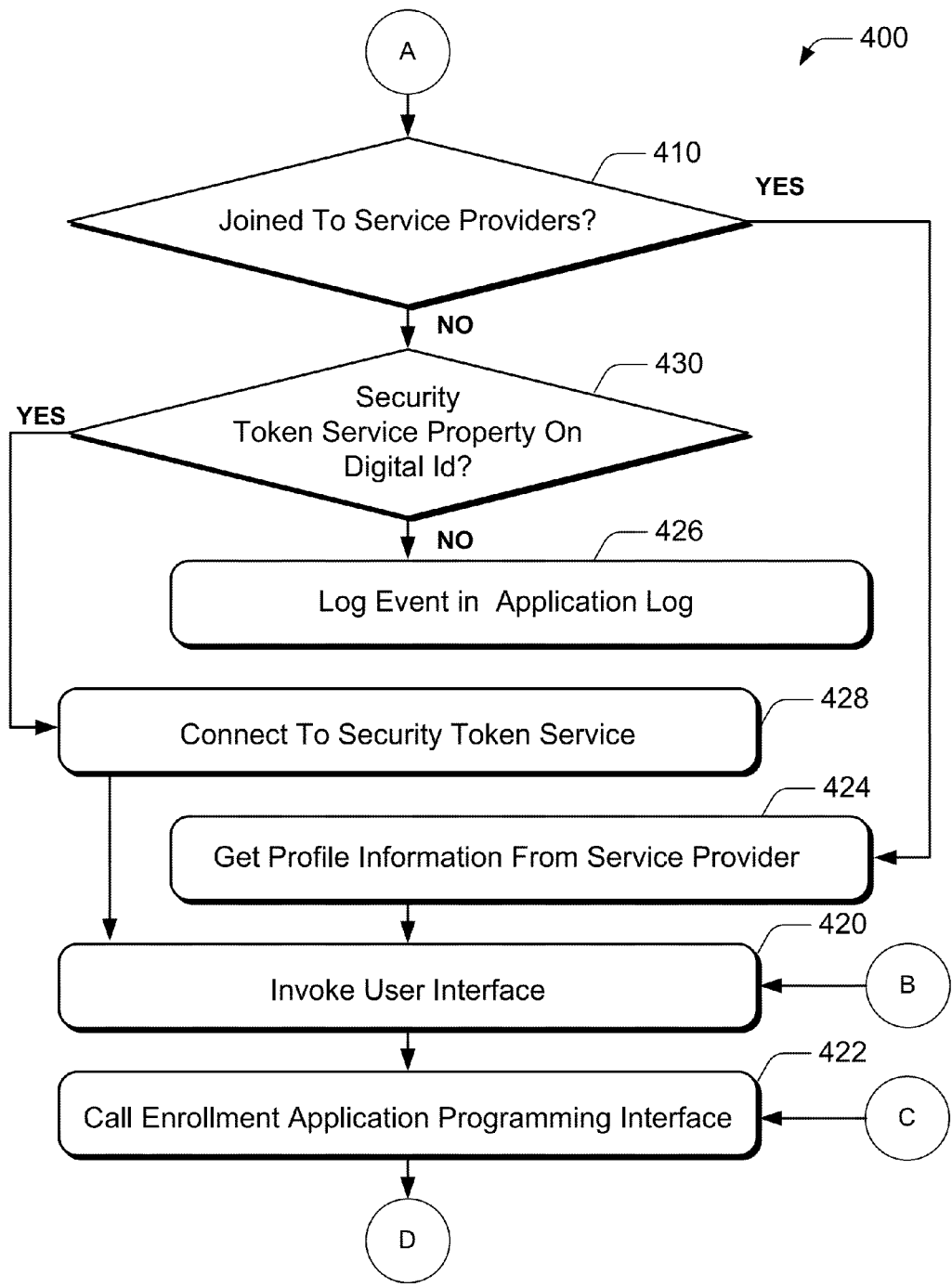
Figure 4C:
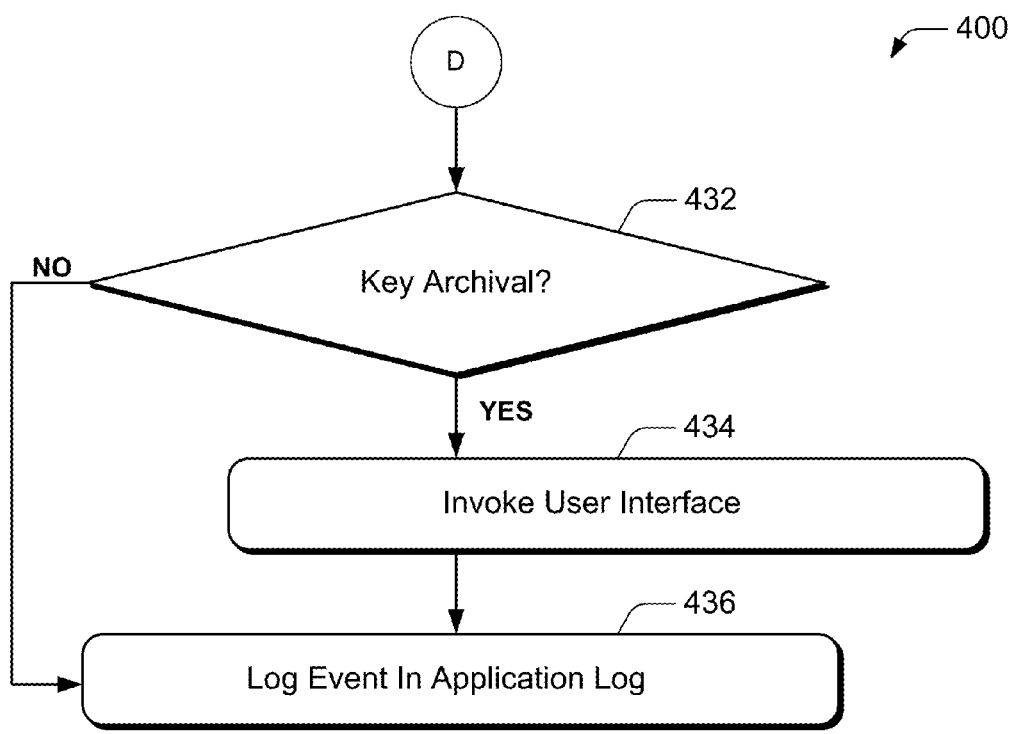

FIGS. 4*a*, 4*b*, and 4*c* illustrate one embodiment of digital information management process 400 that can be applied to DIMS 100 within both non-domain joined computers as well as domain joined computers. From the server 104 side as illustrated in FIG. 1*a*, requests from DIMS 100 applied to both non-domain joined and domain joined computers are responded to. The digital information management process 400 includes auto-enrollment process 402 and includes 404 in which the DIMS 100 examines the digital ID store(s) 206 or the certificate store. The digital information management process 400 including auto-enrollment process 402 continues to decision 406 in which it is determined whether renewal of the digital ID is required. If the answer to decision 406 is no, then the digital information management process 400 including auto-enrollment process 402 terminates. If the answer to decision 406 is yes, then renewal of the digital ID is necessary, and the digital information management process 400 including auto-enrollment process 402 continues to decision 408.

In decision 408, it is determined whether the client computer performing the digital information management process 400 including auto-enrollment process 402 is a domain-joined computer. If the answer to decision 408 is no, then the digital information management process 400 including auto-enrollment process 402 continues to 410 as described below, and the client computer is handled as a non-domain computer as described in the embodiment of DIMS 100 described relative to FIG. 2.

If the answer to decision 408 is yes, then the digital information management process 400 including auto-enrollment process 402 continues to 412 and the client computer is considered to be a domain joined computer. In 412, the central repository or the directory of the computer is checked. The digital information management process 400 including auto-enrollment process 402 then continues to 414 in which a template or profile for digital IDs is checked. The computer then performs a policy check in 416 in which various policies relating to digital IDs and the DIMS are considered. Then, in decision 418, it is determined whether user interaction is requested. If the answer to decision 418 is yes, then the digital information management process 400 including auto-enrollment process 402 continues to 420 as described below. If the answer to decision 418 is no, then the process 400 continues to 422 as described below.

When the digital information management process 400 reaches decision 410 from decision 408, the DIMS 100 determines whether the non-domain joined client computer is joined or subscribed to service providers. If the client computer is connected to a service provider, then the digital information management process 400 continues to 424 in which profile information is received from the service provider. Following 424, the process 400 continues to 420 in which the user interface is invoked so the user can provide input into the digital ID template.

If the answer to decision 410 is no, then the process 400 continues to decision 430 in which the client computer determines whether there is any security token service (STS) property on the digital ID. If the answer to decision 430 is no, then the process continues to 426 in which the event is logged into the application log. If the answer to the decision 430 is yes, then the process 400 continues to 428 in which the client computer connects to the security token service. In 428, the computer is bound to the security token services (e.g., using remote procedure calls (RPC), DCOM or hypertext transfer protocol (HTTP)), and the template information is received from the STS using eXtensible Markup Language (XML), WS-Security SOAP messages, XKMS, etc. Following 428, the process 400 continues to 420 in which the user interface is invoked and the user provides input into the digital ID request message.

Following 420, the process 400 continues to 422 in which the enrollment Application Programming Interface (enrollment API) is called. Following 422, the process 400 continues to 432 in which it is determined whether there is any key archival. 422 and 432 may be reached by both domain-joined client computers and non-domain joined client computers. If the answer to decision 432 is no, then the process continues to 436 in which the event is logged into the application log. If the answer to decision 432 is yes, then the process 400 continues to 434 in which the user interface is invoked so the user can provide input into the digital ID request message. The process 400 then continues to 436 in which the event is logged in the application log.

The process 400 therefore provides a technique by which both domain joined and non-domain joined client computers can undergo auto-enrollment using the DIMS 100. In general, the DIMS 100 allows both types of client computers to access the digital ID templates (or profiles) from the STS or the active directory store, as necessary. The DIMS 100 allows both types of client computers to invoke the user interface, call the enrollment API, archive the keys, and log the event into the application log.

In one embodiment, the templates used in association with the DIMS 100 can use an Extensible Markup Language (XML) based schema. Using XML-based templates decreases the need for more complex template APIs or a fixed schema that cannot be changed at a later date to meet new requirements. The XML schema typically results in a more flexible and self-describing template configuration. The use of XML-based templates also enables digitally signed templates for security and integrity purposes using, for example, XML-based template signing programs, such as XML digital signatures (XMLDSig) standard.

The DIMS 100 is considered an application program that manages the digital IDs (that can be provided by other application programs) through a common service and API. As shown in FIG. 5, one embodiment of the DIMS 100 includes a service component (that may be a life cycle manager 502) and an abstraction layer component 504. The DIMS 100 abstraction layer component 504 includes a variety of known structures and types of credentials, and indicates the type of security used by the DIMS.

The DIMS 100 includes a total life cycle manager 502 for all credentials. The DIMS 100 thereby provides life cycle management as an abstraction. As such, the life cycle manager 502 and the abstraction layer component 504 shown in FIG. 5 may at least partially overlay within the DIMS 100.

The life cycle manager 502 of the DIMS 100 as shown in FIG. 5 acts upon the various credentials and manages the credentials on behalf of the application program 202 or the user (without the knowledge of the application program 202 and/or the user). During this operation, the life cycle manager 502 does not have to provoke each application program 202.

In this disclosure, biometric information is considered one embodiment of credential. Biometrics are automated methods of recognizing a person based on a physiological or behavioral characteristic. The features measured for Biometrics can include one or more of the face, fingerprints, hand geometry, handwriting, iris, retinal, vein, and voice. Enterprise-wide network security infrastructures, government IDs, secure electronic banking, investing and other financial transactions, retail sales, law enforcement, and health and social services are already benefiting from Biometric technologies.

The embodiment of abstraction layer component 504 of the DIMS 100 as shown in FIG. 5 provides a mechanism by which the application programs 202 can store different types of the digital IDs and credentials in a common manner, can retrieve them in a common manner, and can manage them in a common manner. The abstraction layer component 504 is an Application Programming Interface (API) that can be established in a variety of configurations to perform a variety of processes and include a variety of properties. As a result of certain embodiments of the abstraction layer component 504, different application programs do not have to be designed and/or developed using specific digital IDs or digital ID types.

The abstraction layer component 504 is an API interface composed of methods and properties. As such, the abstraction layer component 504 allows the digital IDs and credentials to be uniformly configured regardless of the particular operating environment or the application program 202. In general, the abstraction layer component allows the application programs to be abstracted from underlying trust store structure of the DIMS 100. One embodiment of the underlying trust store structure is described in this disclosure relative to FIG. 3 with the trust store(s) 312, the trust providers 314, the root or trusted STS 316, and the cache of tokens 318 issued by the root 316 or trusted store 312.

The data included in the abstraction layer component 504 includes security context or opaque data, wherein trusted data is not included in the data provided from the application program. Examples of the security context or opaque data includes, but is not limited to, logon ID, hash of user password, credential verifier, etc.

Due to the abstraction layer component 504, the credentials and the digital IDs can be considered to function within an Active Directory domain environment (and also in a stand-alone environment). Alternatively, the credentials and the digital IDs could be agnostic across different platforms and application programs 202. The application programs 202 can be easier to develop since the developers do not have to focus on such authentication concepts as the digital ID and other credential management aspects while developing their application programs. As such, in one aspect of the disclosure, the credential and the digital IDs are developed as part of the abstraction layer component 504 of the DIMS 100.

A user or application program can request a credential to be used for a particular purpose. Also, a particular name can be associated with the credential. Alternatively, a user could request a credential that is associated with a particular target (i.e., including a domain name, web service name, server identifier, etc). The requested credential could be used for a particular application program 202 such as e-mail. As such, the API 204 within the DIMS 100 can open, close, access and retrieve data having a wide variety of attributes using the query, write, modify, create, or delete commands.

If each application program 202 has its credentials or the digital IDs managed separately, then a user could use their key device (e.g., a smartcard) to do certain operations. However, when the user decides to use a different application program 202 that is managed differently, the second application program 202 may not be aware of key devices. In such instances, the digital IDs and credentials are managed and used separately in each particular application program 202.

As such, each application program 202 has to be informed about the digital ID and credentials of other application programs to allow for an effective interface between the application programs. In certain prior systems, the management of the digital IDs and credentials becomes disjoined. The DIMS 100 acts to make the management of the digital IDs and credentials more uniform with a more common user interface.

Figure 6:
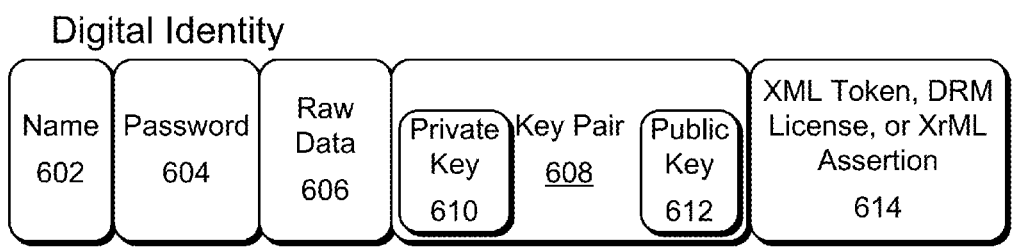
FIG. 6 illustrates a diagram of one embodiment of the digital ID used by the DIMS.

One embodiment of the digital ID 600, which is shown in FIG. 6, can include a user, a user or other type of name 602 to identify the digital ID 600, a password 604, raw data 606, a key pair 608 including a private key 610 and a public key 612, and an XML token, a DRM license, an eXtensible rights Markup Language (XrML) license (or some other similar data identifier) 614. The digital ID 600 is a form of data structure. Digital IDs 600 therefore are considered as a generic object which may contain certificates, credentials, key pairs, licenses, assertions, and passwords; the DIMS 100 can thereupon manage embodiments of different digital IDs 600 in a similar manner. The digital ID 600 can be included as a portion of, or an entire digital ID and private key pair or an XML license having various other types of credentials.

Within the DIMS 100, all these credentials are actually stored in different ways using different memory locations or databases that are collectively called the digital ID store(s) 206 or "token store(s)" 208. The different types of stores may include, for example: a credential store, a key store, a secure store, a DRM (Digital Rights Management) license store, and other such stores. The lower level of the DIMS 100 includes a secure common store 506. The DIMS should be capable of determining the credentials of the application programs within the different stores as well. As such, the DIMS 100 can manage, retrieve, and renew licenses and the like for the DRM system on behalf of an application program.

Digital IDs such as credentials may be viewed like licenses. Digital Rights Management (DRM—produced and distributed by Microsoft Corporation) provides a mechanism for content protection, media, and content management. The DIMS 100 has to maintain licenses for digital IDs such as credentials and they need a way to manage them as well. The same concepts that apply to using the passwords 604, digital IDs, credentials, certificates and the keys 608 as shown in FIG. 6 can be applied to the DIMS 100. The password 604 gives a user the ability to log on until the password expires. Key pairs 608, made of public keys 612 and private keys 610 and the digital ID 600 give a user the ability to authenticate, digitally sign encrypt or decrypt until that digital ID expires. DRM ticket and license credentials provide a user with the ability to interface with a server to access some service or content until that license assertion expires. The DIMS 100 provides the same sort of entitlement concepts.

The DIMS 100 can be applied to computer environment 102 as described relative to FIG. 13 that may include a (client) computer 108. The computer 108 may include, e.g., a desktop, a work station, a laptop, a PDA, a cellular telephone, a peripheral device, an embedded device, or any other computer that can use the DIMS 100 to provide considerable authentication capabilities. Since computers are often used in homes and small or large business environments, it is important that the DIMS 100 is capable of providing security widely and seamlessly. In one embodiment, the DIMS 100 is configured as a middleware service or component. As such, the DIMS 100 is implemented in the Application Programming Interface (API); associated interfaces could also be defined to integrate the DIMS 100 with certain client services. The DIMS 100 could be implemented as a technology to a client operating within the client/server computer environment.

An operating system (such as the Windows® Operating System that is produced and distributed by Microsoft Corporation) that integrates the DIMS 100 could enable users (from novice to advanced) to secure their documents, files, data, messages, etc. As such, users can securely collaborate with family members, peers, team members, friends, and business partners in a secure and easy to use manner.

For the use of digital IDs to be fully accepted and utilized, home users who are not part of a greater corporate network and use local Internet Service Providers (ISPs) can obtain and utilize digital IDs with little or no interaction. The entire digital ID lifecycle should be managed by the DIMS 100 located primarily in the client computer that is associated with each user. The user will not have to understand public key infrastructure (PM) concepts, how to manage a PM trust, DRM licensing, cryptographic models or other authentication concepts of similar complexity.

The DIMS 100 is simple for a user to interface with, while providing a highly secure multi-user security collaboration solution available for such computer environments 102 and/or computers 108 as shown at 1302 in FIG. 13. Users can manually manage the life cycle of public key credentials in many network configurations outside of the domain (enterprise) environment. The DIMS 100 therefore provides an increased differentiation on traditional Public Key Infrastructure (PM) or conventional DRM capabilities in a desktop client.

Certain embodiments of the DIMS 100 can solve several problems. The DIMS 100 provides an effective user interface that can be accessed for security management or troubleshooting purposes. Since the DIMS 100 can manage a wide variety of digital IDs, the security as applied to the different application programs is consistent and comprehensible by users.

One embodiment of the DIMS 100 can provide for smartcard PIN entry and caching. The DIMS 100 can function as a Biometric Template store. As such, an effective user interface (UI) securely accesses the application programs 202. DIMS stores tokens on behalf of application programs.

Figure 7:
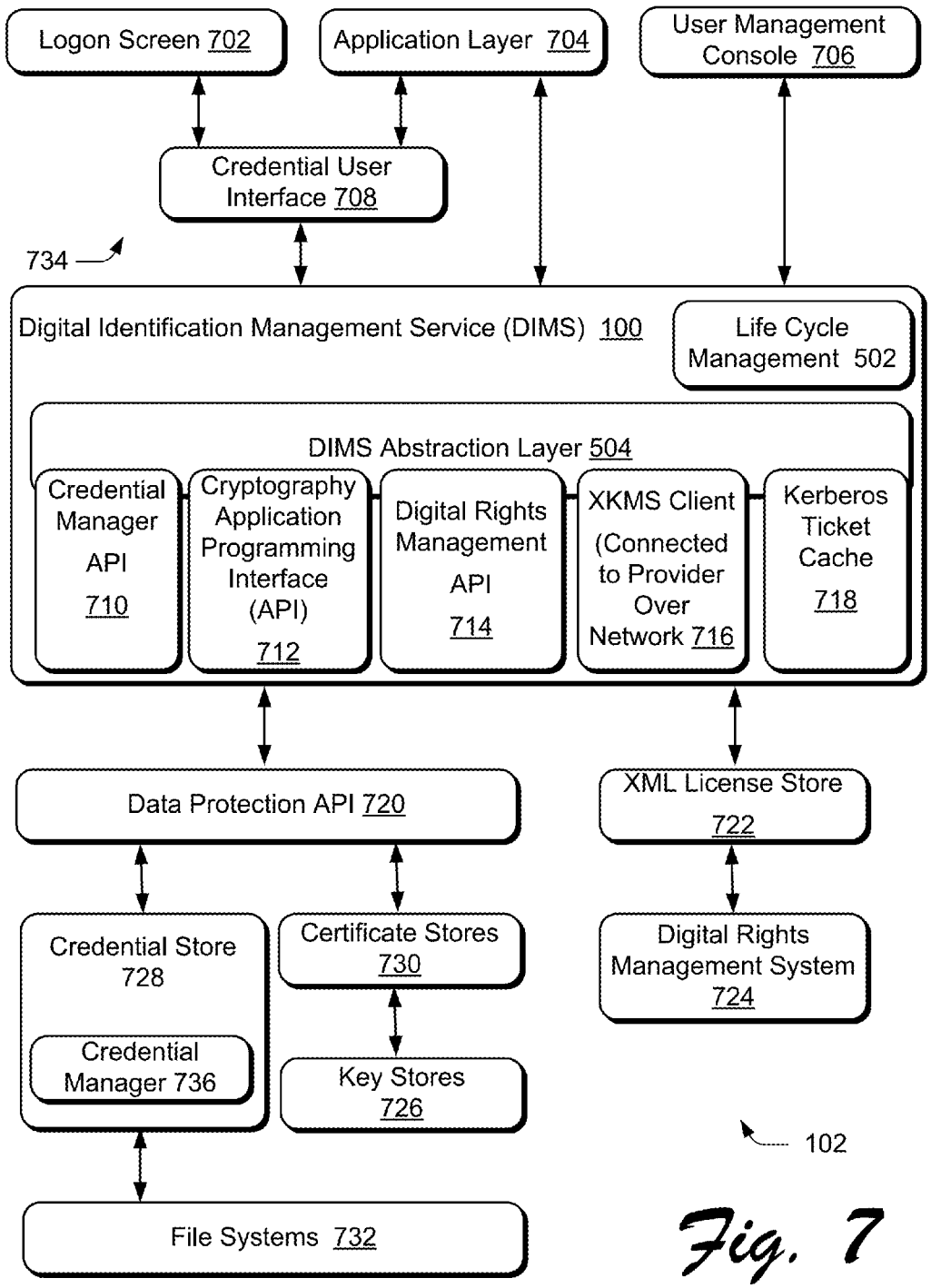
FIG. 7 illustrates a block diagram of one embodiment of the DIMS and certain associated components within a computer environment.

FIG. 7 illustrates certain software-based components within the computer environment 102 including the DIMS 100 that performs a digital information management process 400 including an auto-enrollment process 402. The software-based components illustrated in FIG. 7 may be considered as an altered embodiment of computer environment 102 including the DIMS 100 from that described relative to FIG. 2. The computer environment 102 includes a logon screen 702, an application layer 704, a user management console 706, a credential user interface 708, the DIMS 100, and a variety of Application Programming Interfaces (API) and clients referenced as 710, 712, 714, 716, 718, and 720. Additionally, the computer environment 102 includes a credential store 728, an XML license store 722, an XKMS client 716, a Kerberos ticket cache 718, a digital rights management system 724, a cryptographic portion 726, a credential store 728, and a file system 732.

The auto-enrollment process of the DIMS 100 can be triggered by the logon process (such as Winlogon in Windows® Operating Systems). The user management console 706 is described that treats all credentials and digital IDs in the same manner whether they are passwords, keys, x.509 certificates, or XRML licenses. In those embodiments where the DIMS 100 is contained within the client 108 of FIG. 1a or the stand-alone computer 110 in FIG. 1b, the user can configure and control the generation of the digital IDs by the DIMS 100 to provide a consistent experience for the user. As such, the user will be able to more consistently and effectively apply the digital identification as the user utilizes the application programs.

The application layer 704, in general, integrates the application programs 202 as illustrated in FIG. 2. The logon screen 702 allows the user to interface with the computer environment 102 when they logon by providing a security context to DIMS. The credential user interface 708 provides a user interface by which the user can generate, store or retrieve credentials using the DIMS 100.

The life cycle manager 502 and the DIMS abstraction layer 504 is also described in general relative to FIG. 5. The DIMS abstraction layer provides a uniform interface between the credential manager API 710, the cryptographic API 712, the digital rights management API 714, the XKMS client 716, and the Kerberos ticket cache 718, or one of many other token types as alluded to in this disclosure. The abstraction layer allows the general purpose computer of a user to decrypt encrypted data communications. As such, one digital ID can be used by the DIMS 100 to interface in a common manner with each API 710, 712, 714, and client 716. The XKMS client 716 and the digital rights management API 714 can interface with the XML license store 722 to obtain the necessary license to access the digital rights management system 724 (such as the Digital Rights Management system that is produced and supplied by Microsoft Corporation). The Kerberos ticket cache 718 is a persisted store that contains Kerberos tickets that can be quickly retrieved and utilized by the DIMS abstraction layer 504.

The data protection API 720 can interface with the DIMS abstraction layer 504 through one or more of the credential managers API 710 or the cryptographic API 712. The credential store 728 provides access to the file system 732 of the computer from the data protection API. The certificate stores 730 and the key stores 726 are in communication with (and store data that can be accessed by) the data protection API. As such, the components 702, 704, 706, and 708 (that may be considered a shell layer 734) can all interface uniformly with the components (e.g., APIs) that are below the DIMS abstraction layer. The abstraction layer can contain a database table of all properties that applications or users can query to find the appropriate digital ID or token to use for a given purpose or situation.

One embodiment of the DIMS 100 interfaces with, and partially integrates, a credential manager that is located within the credential store 728 as shown in FIG. 7. The credential manager 736 within the credential store 728 can be password based, smartcard based, or private key based. One embodiment of the credential manager has data storage capabilities and it also has some ability to search for files. The credential manager acting by itself may not be capable of renewing digital IDs.

Many embodiments of the DIMS 100 can be operationally located primarily within the client computer 108, particularly those relating to non-domain joined computers. Positioning the DIMS 100 primarily in the client 108 is preferred since this represents the location that most effectively does renewal within the lifecycle management, as well as other functions performed by the DIMS 100. The DIMS 100 can be applied to all levels of users of window-based operating systems (such as the Windows XP® operating system that is produced and distributed by Microsoft Corporation), and allows organizations to deploy the digital IDs more easily to client computers 108 through auto-enrollment service including those computers that are non-domain joined.

Methods associated with the DIMS 100 that are included within secure objects include private key signing, private key encryption/decryption, secret key encryption/decryption, secret key hashing, validation (trusted digital IDs are protected), authentication, and authorization.

If an application program is configured or programmed with the DIMS 100 as described in this disclosure, the application program does not have to be configured or programmed by a developer to provide for a private key to be received from a user for authentication. In one embodiment, all the DIMS 100 requests from a user the application program or service target information. As such, a developer can program an application program such that the user can search for a credential that has an associated prescribed usage, name, and/or target criteria. Alternatively, the user can search for a credential that includes a known Internet domain name. There may be different embodiments of credentials that may be associated with a given user name and password. Another credential may be associated with a smartcard or key device.

In one aspect, the DIMS 100 manages the digital IDs relative to each application program 202. Therefore, each application program 202 is able to readily interface with other application programs. In one aspect, the application programs 202 store the identity of the operating system to request and utilize the DIMS 100.

The DIMS 100 addresses many issues including enhancing the acceptance of the deployment of Virtual Private Networks (VPN). Such acceptance results from the ease of deploying home user digital IDs. Such protocols as Layer 2 Transport Protocol (L2TP) and Internet Protocol Security (IPSEC) require a digital ID such as a public key certificate to be deployed to home computers. The deployment of the public key digital ID is simplified by the use of the DIMS 100.

The DIMS 100 is therefore designed to be very generic and can perform such processes as shown in FIGS. 8, 9, 10*a*, 10*b*, 11, and 12. The DIMS 100 is intended to be relatively simple, yet universal, because when the digital IDs are managed by the DIMS 100, application programs interfacing with the DIMS don't have to be programmed to provide a variety of different security properties and characteristics.

Figure 8:
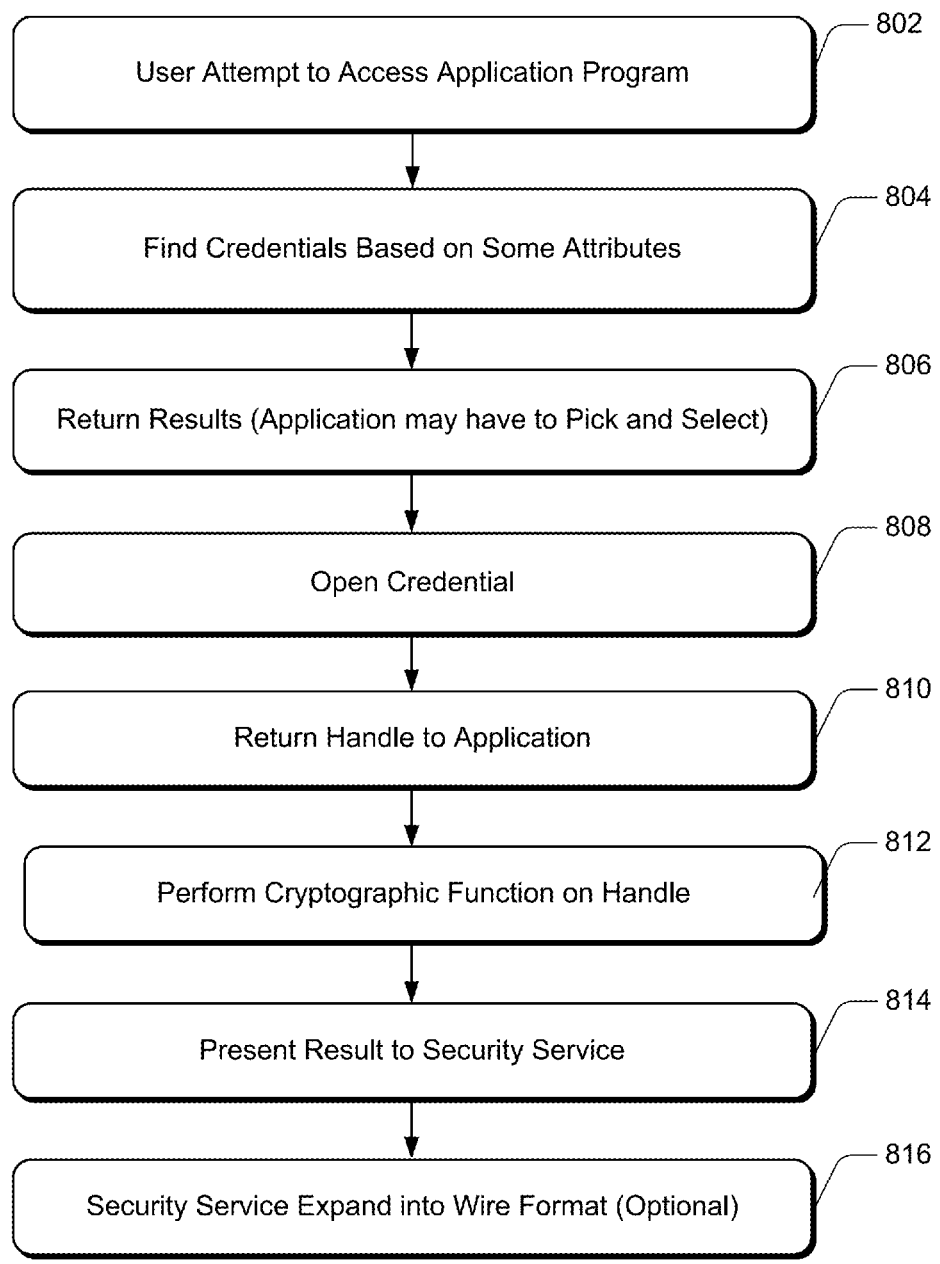
FIG. 8 illustrates a flow-chart of one embodiment of an authentication process that can be performed by the DIMS.

FIG. 8 shows one embodiment of authentication process 800 utilized particularly within the web environment. In the authentication process 800, the user attempts to access a particular application program. In 804, the DIMS 100 finds the credentials based on some attribute. In 806, the DIMS 100 returns the results, where the application program may have to pick and select among various users. In 808, the credentials are opened based on the query criteria. In 810, the handle is returned from the DIMS 100 to the application program 202 as shown in FIG. 2. In another embodiment a token is returned to the application program instead of the handle. The token or the handle that is returned to the application program includes data that indicates the process is being authenticated. In 812, a cryptographic function is performed on the handle. In 814, the result of 812 is presented to the security service. In 816, the security service is expanded into the wire.

In one embodiment of the authentication process 800, each one of 802, 804, 806, 808, 810, 812, 814, and 816 occurs in a general purpose computer 1302 as shown in FIG. 13. In the authentication process 800: 802, 804, 806, 808, and 810 may occur within the API layer. 806 and 808 can occur outside of the API layer within the application program.

Figure 9:
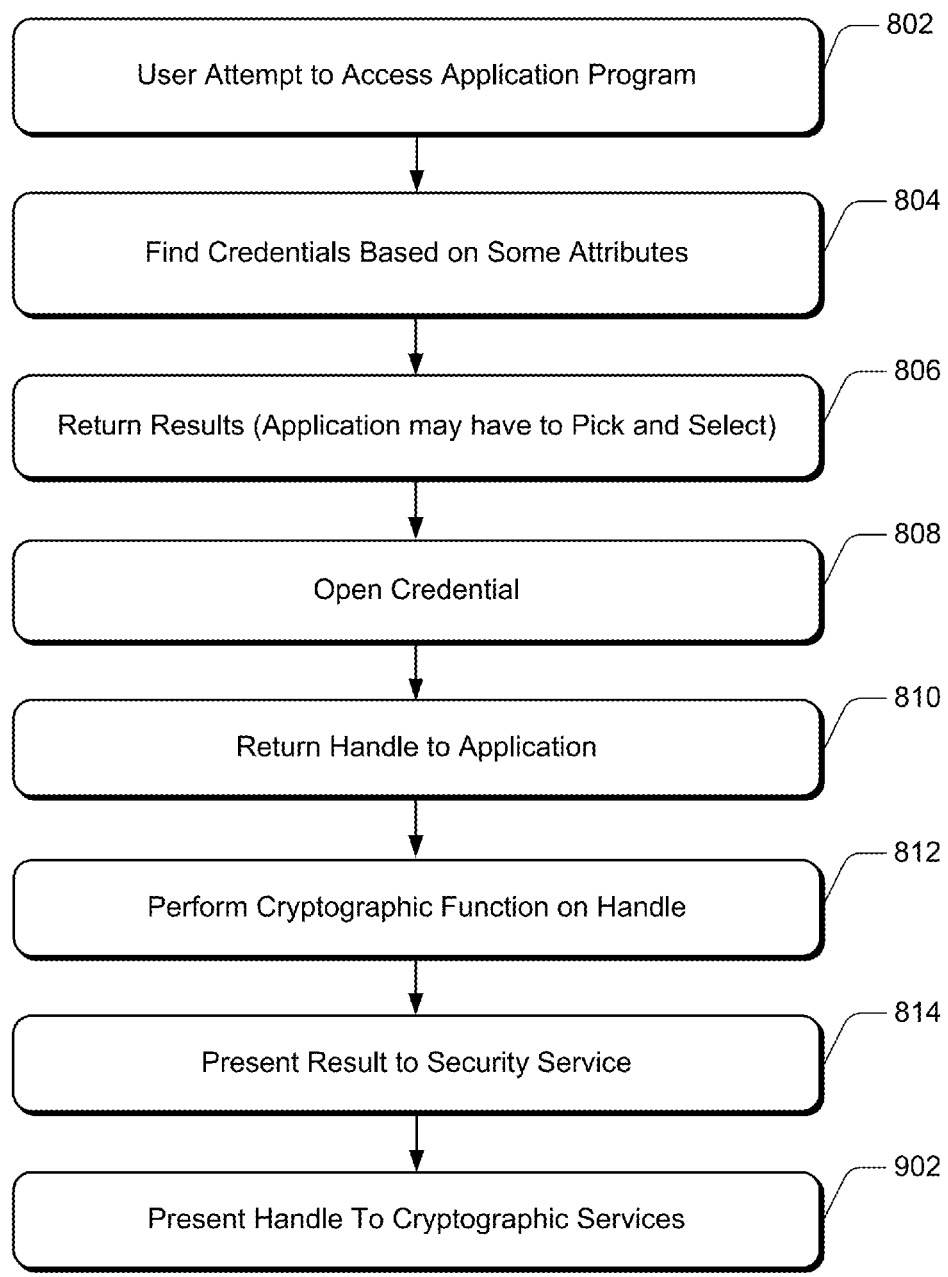
FIG. 9 illustrates a flow-chart of one embodiment of a decryption process that can be performed by the DIMS.

FIG. 9 shows one embodiment of decryption process 900. In the decryption process 900, each one of 802, 804, 806, 808, 810, 812, and 814 is identical to the same numbered element in the authentication process 800 described relative to FIG. 8. The decryption process 900 of FIG. 9 does not include element 816 described relative to FIG. 8. The decryption process 900 described relative to FIG. 9, however, does include 902 (not included in the authentication process 800 of FIG. 8) in which the handle is presented to a cryptographic service to perform the encryption.

Figure 10A:
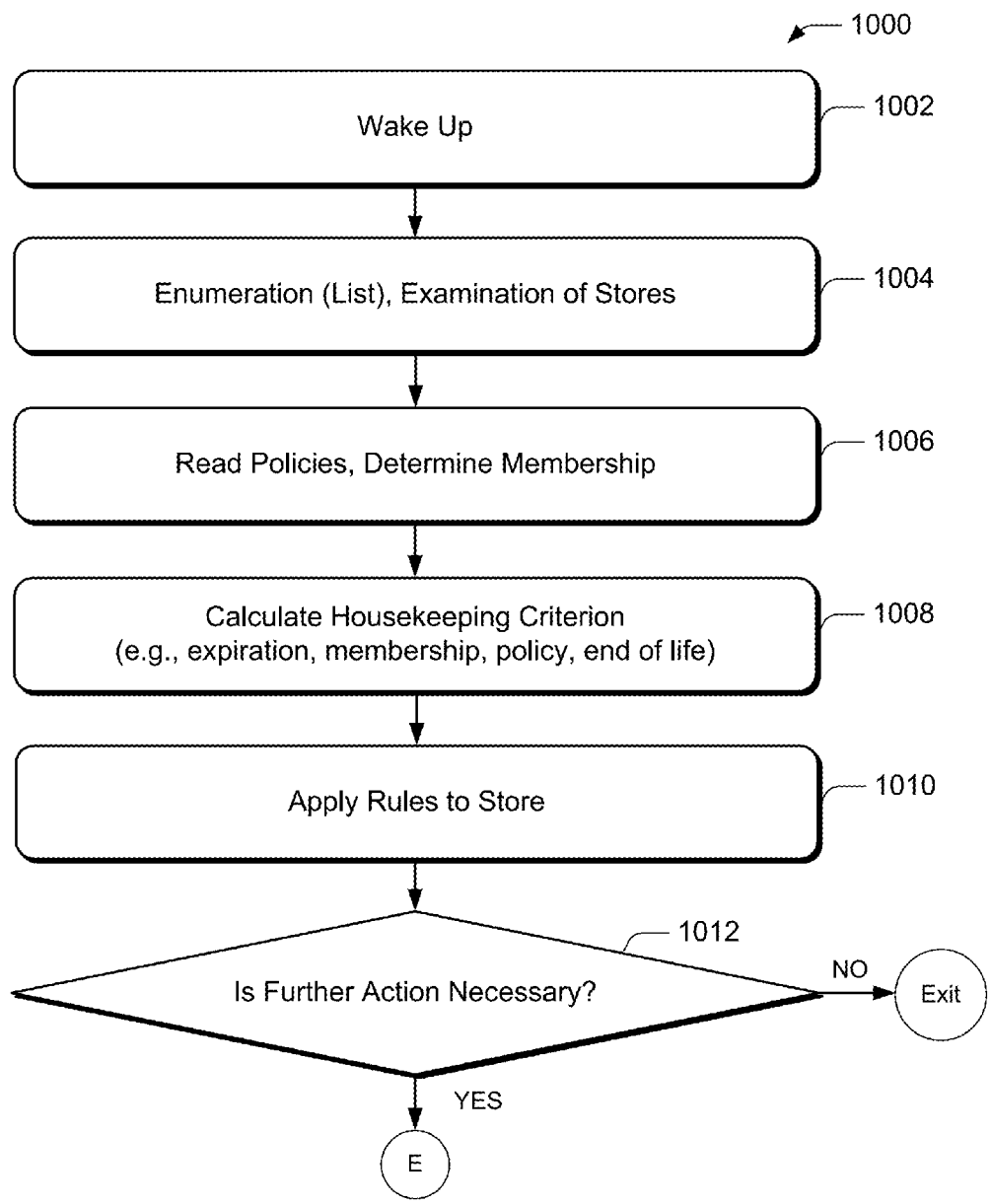
FIGS. 10a and 10b illustrate a flow chart of one embodiment of a lifecycle management process that can be performed within the DIMS.
Figure 10B:
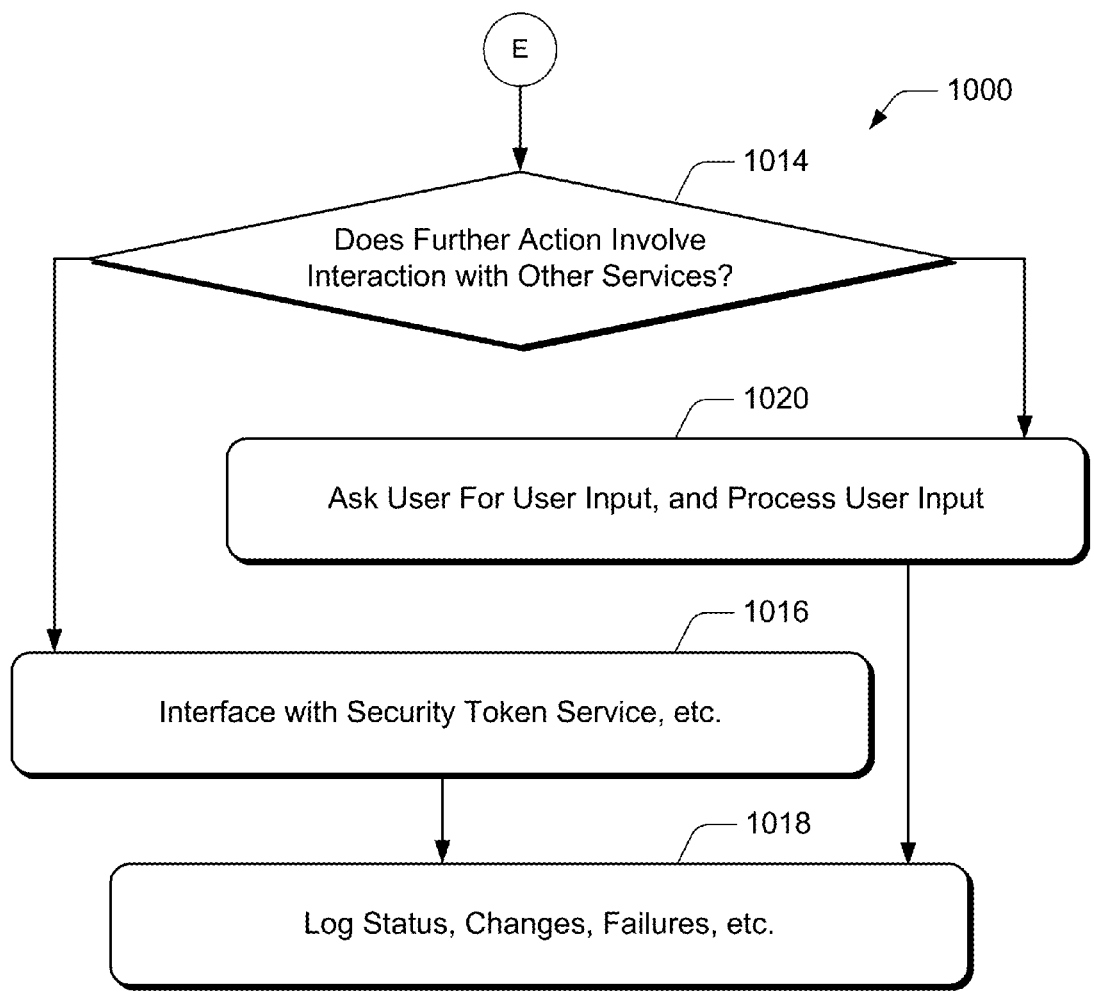

FIGS. 10*a* and 10*b* illustrate one embodiment of the digital ID lifecycle management process 1000 performed by the DIMS 100. The lifecycle management process 1000 of the digital IDs provides for digital ID renewal, superseding of digital IDs and multiple signature requirements. The lifecycle management process 1000 includes 1002 in which the process 1000 is woken up by the computer. The lifecycle management process 1000 continues to 1004 in which the digital IDs in the digital ID store(s) 206 (as described relative to FIGS. 2 and 3) are listed (enumerated) and examined. During 1004, the current state of the store(s) is provided by the DIMS 100. In 1006, the policies are read, and the membership of the DIMS 100 is considered. As such, the DIMS 100 can rely on local policies or central policies to define lifecycle management criteria.

The lifecycle management process 1000 continues to 1008 in which the DIMS 100 uses housekeeping. Such housekeeping includes expiration of a digital ID, matters of membership of a digital ID, policy of a digital ID, or end of life of a digital ID. The lifecycle management process 1000 continues to 1010 in which the rules and policies as calculated in 1010 are applied to the digital ID store(s) 206.

The lifecycle management process 1000 continues to decision 1012 in which the DIMS considers whether any further action is necessary. Depending upon the type of action, such further action may involve interaction with other security token services, or not. If the answer to the process 1012 is no, then the process 1000 is terminated because no further action is necessary. If the answer to the process 1000 is yes, then the process continues to decision 1014 in which the DIMS 100 considers whether the further action involves interaction with another service, such as a security token service.

If the answer to decision 1014 is yes, then the lifecycle management process 1000 continues to 1016 in which the DIMS interfaces over the network with the security token service. Following 1016, the process 1000 logs the status, change, failure, etc. in 1018.

If the answer to decision 1014 is no, then the further action involves such user input as a change in password, etc. If the answer to decision 1014 is no, then the lifecycle management process 1000 continues to 1020 in which the user is asked for the user input, and the computer running the DIMS 100 processes the user input (such as change in password). Following 1020, the process 1000 logs the status, change, failure, etc. in 1018.

With the lifecycle management process 1000, the client computer running the DIMS can manage the lifecycle actions of the digital IDs, such as creating, destroying, and modifying the digital IDs.

Figure 11:
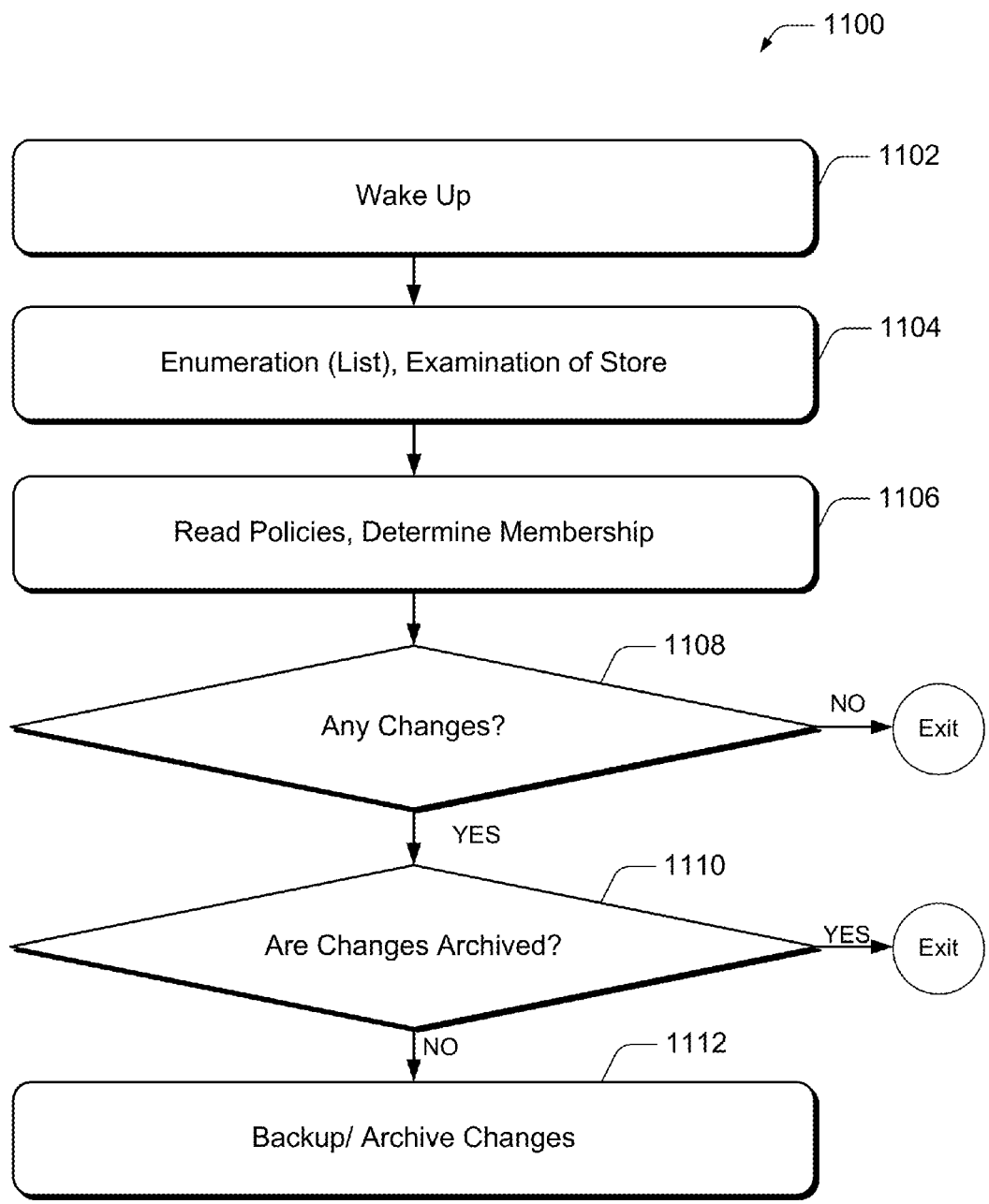
FIG. 11 illustrates a flow chart of one embodiment of a housekeeping process that can be performed by the DIMS.

FIG. 11 shows one embodiment of housekeeping process 1100 performed by the computer running the DIMS. The housekeeping process 1100 includes 1102 that wakes up the housekeeping process 1100. The housekeeping process 1100 continues to 1104 in which the digital ID store(s) 206 (as described relative to FIGS. 2 and 3) is enumerated and examined. During 1104, the current state of the digital ID store(s) 206 is determined by the DIMS 100.

The housekeeping process 1100 continues to 1106 in which the policies and the membership of the housekeeping process 1100 is determined by the computer and the DIMS. The housekeeping process 1100 continues to decision 1108 in which it is determined whether there are any changes to the membership, or other consideration, of the DIMS. If the answer to decision 1108 is no, then the process 1100 terminates because the current state of the policies and/or membership are acceptable.

If the answer to decision 1108 is yes, then the housekeeping process 1100 continues to 1110 in which the DIMS 100 determines whether the changes have been archived. If the answer to 1110 is yes, then the housekeeping process 1100 is terminated because all the changes that had to be made have been made. If the answer to decision 1110 is no, then the housekeeping process 1100 continues to 1112 in which any changes are backed up or archived. As such, the housekeeping process 1100 provides a mechanism by which the policies and memberships of the policies can be made more current.

Figure 12:
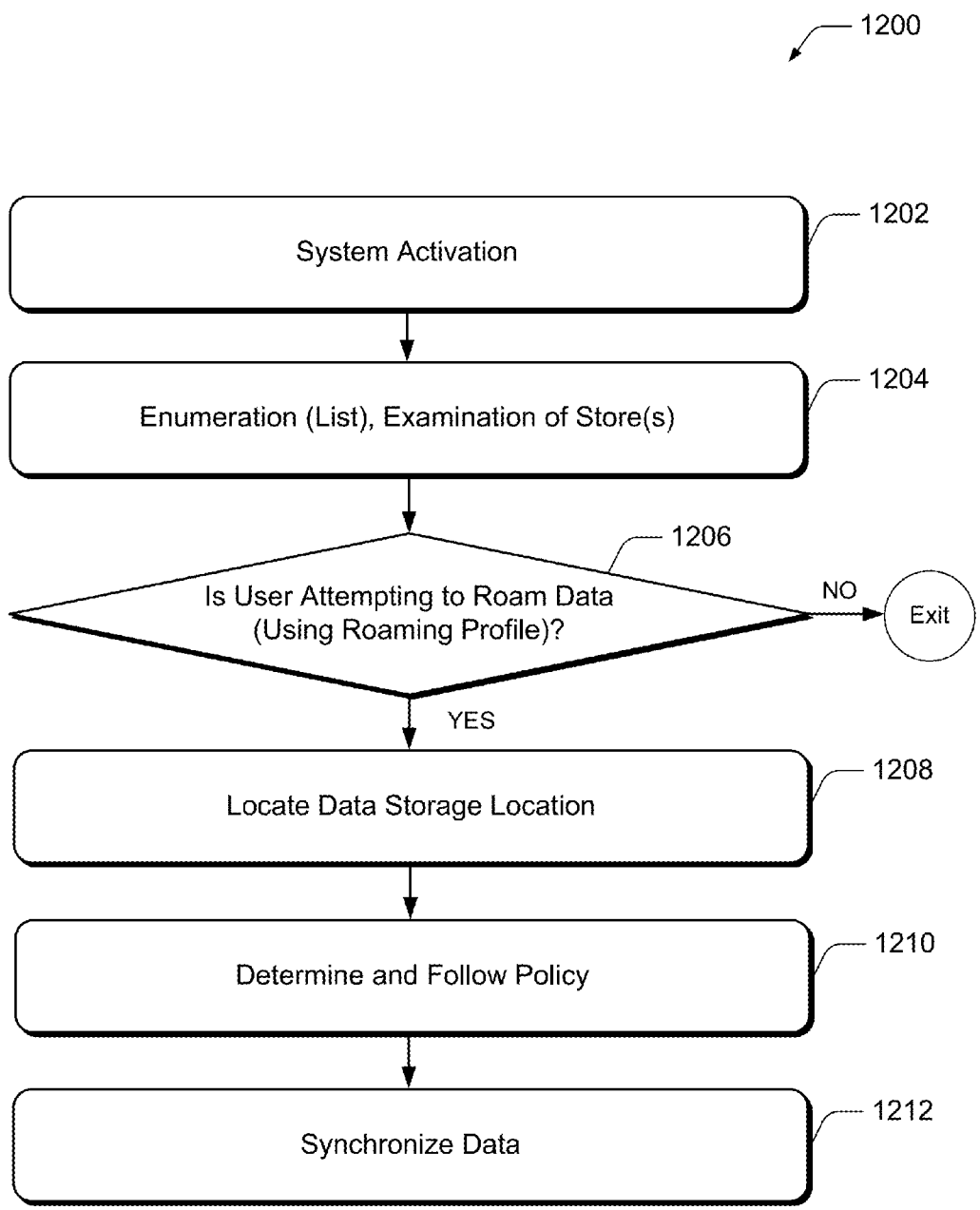
FIG. 12 illustrates a flow chart of one embodiment of a roaming process that can be performed by the DIMS.

Certain embodiments of the DIMS 100 can provide for roaming and/or replication of signing and encryption keys as well as tokens, credentials or licenses. FIG. 12 shows one embodiment of roaming process 1200. The DIMS 100 can provide a single user interface for an individual user over a variety of locations. As such, a single user can interface with the DIMS 100 to manage a digital ID over many networked locations such as over the network or Internet. The DIMS allows access to directly trusted digital IDs instead of using (for example) a rooted x.509 certificate hierarchy. The DIMS 100 can share signing and encryption keys included in the digital ID collection representing all stores. As such, the authentication and services provided by an operating system can be enhanced by the DIMS. This is a consideration for the server services scenarios where keys are shared across multiple servers.

As with other networked-computer users, it is important to provide some roaming capabilities for users of the DIMS. Supporting multiple keys and roaming profiles is difficult for customers of current enrollment systems such as an x.509 public key infrastructures (PM). Software based keys are viewed by many customers as not very portable or manageable. Smartcards are currently used in many companies as a unitary solution for key storage and employee badges.

The roaming process 1200 includes a system activation in 1202. The roaming process 1200 like housekeeping process 1100 continues to 1204 in which the digital IDs in the digital ID store(s) 206 (as described relative to FIGS. 2 and 3) are enumerated (listed) and examined. During 1204, the current state of the digital ID store(s) 206 is determined by the DIMS 100.

The roaming process 1200 continues to 1206 in which it is determined whether the user is attempting to roam data. Such an indication is typically derived by user input provided to the client computer from a remote computer. If the answer to decision 1206 is no, the roaming process 1200 terminates since there is no desire by the user to use the roaming program.

If the answer to decision 1206 is yes, the roaming process 1200 continues to 1208 in which the DIMS locates the remote data storage location from which the user is seeking to roam. The roaming process 1200 continues to 1210 in which the DIMS determines and follows the policy for the roaming process 1200. For example, roaming may not be permitted from certain locations and/or times. The roaming process 1200 continues to 1212 in which the data is synchronized from the location from which the DIMS is located to the remote location at which the user is seeking to roam.

DIMS can be applied to many key device systems to provide security as well as an abstraction layer, including smartcards. One of the issues with smartcards is the use of encryption keys and data persistence. If the key on a smartcard is used to encrypt files or email and the smartcard is subsequently damaged or lost, the data in the files or email will no longer be accessible.

Auto-enrollment and manual enrollment codes can interface with the cryptographic service provider (CSP) model and management layer to retrieve the key after key generation for the purpose of key archival. Certain embodiments of DIMS will support key archival when key generation is performed on the card or in a secure HSM device.

In one embodiment, the CSP writes the keys and the digital IDs to the smartcard. There are two scenarios that are described. The smartcard can do the key generation or a Hardware Security Module (HSM) can do the key generation. In the first scenario the challenge is in securely communicating from the card module to the archival engine. In the second scenario, HSM provides cryptographic functions for secure transactions, such as transactions in financial networks. The software code is communicated from the HSM to the engine, then to the smartcard module. The communication with the archival engine can be relatively simple since it is a system component.

Secure collaboration is becoming more important in network scenarios and configurations. Many encryption technologies such as the Encrypting File System (EFS—produced and distributed by Microsoft Corporation) require the use of public key technology to implement a secure solution. One embodiment of such an encrypting file system is described in U.S. Pat. No. 6,249,866, which issued on Jun. 19, 2001 to Brundrett et al. with the title "Encrypting File System and Method" (assigned to the assignee of the present disclosure), and is incorporated by reference herein in its entirety. Certificates, enrollment and PKI trust management, such as EFS and other current encryption algorithms utilize, are far too complex for most users to understand. As such, providing certain embodiments of the DIMS 100 can simplify, maintain the security of, and thereby increase the acceptance of secure collaborative systems.

Assume that a computer system under the control of the user has a common store 506 that includes the token store 208 containing various files and/or programs that need to expire, retire, and/or be renewed. The user and the application programs 202 are very likely unaware of these various schedules, especially if a user has a large number of them. Consider that certain users often access a large number of different web sites that may require different digital IDs, then it would benefit the DIMS 100 to be an automated system. The user has to be aware of whether they should change a password/login, or if the password/login should be renewed or requires a renewal process.

Allowing the DIMS 100 to perform a digital identity management process (without the user and/or the application program being aware) is desirable. If each of the users and application programs have to be aware of these DIMS 100 considerations, the digital identity management process becomes much more complex and less useful.

Current application programs provide for different store protocols, and therefore a different way of protecting these credentials. An important aspect of the DIMS 100 is the credentials that are stored have to be protected in some way. If the credentials are just sitting resident on a hard drive in a computer 108 of a computer environment 102, other application programs can steal them (e.g., bad code or internet viruses could steal the credentials). The DIMS 100 provides a mechanism to protect the credentials.

Operating systems and application programs 202 have each protected credentials using different methods and by storing the credentials in different locations. One aspect of application programs 202 is how they are protected. The application programs 202 typically have to be able to access data from certain prescribed locations.

Application programs 202 typically have to be aware of how to get through that protection to obtain data and run, and also be able to prove that they are a valid application program 202 at different locations within the operating system. The common store 506 concept therefore represents a secure store that would store many types of secrets or credentials. The credentials of the application programs would be protected within the common store 506, and in a form such that they would be searchable, and so data within one application program could be readily used by another application program within the common store 506.

Within the common store 506, only the secret or private portion of the field(s) are protected like the private key, password, symmetric key, etc. Typically, the private portions are encrypted with another token, password, biometric key, etc. One of the more common problems for users, especially in the case of the Encrypting File System (EFS), is that they often lose their certificates (keys) when they re-install software into the computer, crash the operating system, etc. This common situation has ramifications for security. The auto-enrollment service, as part of its digital ID management functions, detects new digital IDs that have been auto-generated or automatically enrolled without key archival in the template. When auto-enrollment detects such a digital ID, the auto-enrollment indicates to the user over a user interface (e.g. on the computer display) that they have a new digital ID that is not backed up, and would they like to back it up now. The dialogue will display a selectable list of those digital IDs that have not been backed up and are new.

Considering the secure store concept (in one example), the DIMS 100 stores tokens and their attributes in a relational database, based on the SQL server engine. Each credential could be stored as a distinct record. This record is maintained within the API of the client. As with relational databases, there will be n-number of fields that store various attributes associated with that credential. Some of those fields are protected (including the sensitive fields), and some are not protected. The attributes could even be stored in a flat database so that various aspects are protected against other users from enumerating them. Some of the attributes would be encrypted, such as would be the case with a private key of a PM key pair.

The common store 506 that stored various attributes can have a variety of configurations. The common store 506 can be extensible. The common store 506 can store data relating to multiple users in such a manner that the users should be able to protect their data from each other in a common manner. The application programs should all have a known way to access data and prove their identity, and indicate for whom they are acting.

A user may use multiple computers while using the same credentials. Suppose a user wishes to securely access and use a website at different locations. Users want to access their e-mail securely at different locations. A user may want to sign mail wherever he is and, therefore, the user needs his credentials wherever he accesses the network. As the user travels to different locations across the network, the store has to be available for that user. Conversely, the store has to follow the user to his different locations. As such, in one aspect of the disclosure, the store has to be transportable in a secure way so that it can be accessed over the network using a media like a key device such as a smartcard. The common store 506 has to be protected should it be intercepted or attacked in transport. As such, if a user logs onto a network, the network accesses the user's digital ID store(s) 206. The stores of the users are available wherever they travel.

A user can store the data associated with the DIMS 100 on one smartcard (if the smartcard has enough storage and processing capabilities). Alternately, the data associated with the DIMS 100 could be stored on a floppy disk or other transportable memory device, or the data could be stored on a server. A store associated with the DIMS could be routed to a user over the network. One embodiment of the DIMS can be configured so a user can import a store, export a store, and/or unlock a store. The data protected with DIMS can be protected with the smartcard, or protected with a password. A user can move that data around as they see fit, or back it up.

One embodiment of DIMS provides for a common API 204 and common store 506. There are a variety of implementations of this that are within the scope of the present disclosure. Since small businesses, large businesses, and individuals can easily sign up for managed services for Public Key Infrastructure (PM) and the Digital Rights Management (DRM) scenarios, it is important to ensure that the DIMS 100 has the same ease of access. Alignment between the DRM and the eXtensible Rights Markup Language (XRML) license store will enable the DRM scenarios for content control.

FIG. 13 illustrates an example of a suitable computer environment or network 102 which includes the DIMS 100. Similar resources may use the computer environment and the processes described herein.

The computer environment 102 illustrated in FIG. 13 is a general computer environment, which can be used to implement the techniques described herein. The computer environment 102 is only one example of a computer environment and is not intended to suggest any limitation as to the scope of use or functionality of the computer and network architectures. Neither should the computer environment 102 be interpreted as having any dependency or requirement relating to any one or combination of components illustrated in the exemplary computer environment 102.

The computer environment 102 includes a general-purpose computing device in the form of a computer 1302. The computer 1302 can be, for example, one or more of a stand-alone computer, a networked computer, a mainframe computer, a PDA, a telephone, a microcomputer or microprocessor, or any other computer device that uses a processor in combination with a memory. The components of the computer 1302 can include, but are not limited to, one or more processors or processing units 1304 (optionally including a cryptographic processor or co-processor or other type of security processor or co-processor), a system memory 1306, and a system bus 1308 that couples various system components including the processor 1304 and the system memory 1306.

The system bus 1308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA)

bus, a Video Electronics Standards Association (VESA) local bus, and a Peripheral Component Interconnects (PCI) bus also known as a Mezzanine bus.

The computer 1302 typically includes a variety of computer readable media. Such media can be any available media that is accessible by the computer 1302 and includes both volatile and non-volatile media, and removable and non-removable media.

The system memory 1306 includes the computer readable media in the form of non-volatile memory such as read only memory (ROM) 1310, and/or volatile memory such as random access memory (RAM) 1312. A basic input/output system (BIOS) 1314, containing the basic routines that help to transfer information between elements within the computer 1302, such as during start-up, is stored in the ROM 1310. The RAM 1312 typically contains data and/or program modules that are immediately accessible to, and/or presently operated on, by the processing unit 1304.

The computer 1302 may also include other removable/non-removable, volatile/non-volatile computer storage media. By way of example, FIG. 13 illustrates a hard disk drive 1316 for reading from and writing to a non-removable, non-volatile magnetic media (not shown), a magnetic disk drive 1318 for reading from and writing to a removable, non-volatile magnetic disk 1320 (e.g., a "floppy disk"), and an optical disk drive 1322 for reading from and/or writing to a removable, non-volatile optical disk 1324 such as a CD-ROM, DVD-ROM, or other optical media. The hard disk drive 1316, magnetic disk drive 1318, and optical disk drive 1322 are each connected to the system bus 1308 by one or more data media interfaces 1326. Alternatively, the hard disk drive 1316, magnetic disk drive 1318, and optical disk drive 1322 can be connected to the system bus 1308 by one or more interfaces (not shown).

The disk drives and their associated computer-readable media provide non-volatile storage of computer readable instructions, control node data structures, program modules, and other data for the computer 1302. Although the example illustrates a hard disk within the hard disk drive 1316, a removable magnetic disk 1320, and a non-volatile optical disk 1324, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 102.

Any number of program modules can be stored on the hard disk contained in the hard disk drive 1316, magnetic disk 1320, non-volatile optical disk 1324, ROM 1310, and/or RAM 1312, including by way of example, the OS 1328, one or more application programs 202, other program modules 1330, and program data 1332. Each OS 1328, one or more application programs 202, other program modules 1330, and program data 1332 (or some combination thereof) may implement all or part of the resident components that support the distributed file system.

A user can enter commands and information into the computer 1302 via input devices such as a keyboard 1334 and a pointing device 1336 (e.g., a "mouse"). Other input devices 1338 (not shown specifically) may include a microphone, joystick, game pad, satellite dish, serial port, scanner, and/or the like. These and other input devices are connected to the processing unit 1304 via input/output interfaces 1340 that are coupled to the system bus 1308, but may be connected by other interface and bus structures, such as a parallel port, game port, or a universal serial bus (USB).

A monitor, flat panel display, or other type of computer display 1342 can also be connected to the system bus 1308 via an interface, such as a video adapter 1344. In addition to the computer display 1342, other output peripheral devices can include components such as speakers (not shown) and a printer 1346 which can be connected to the computer 1302 via the input/output interfaces 1340.

Computer 1302 can operate in a networked environment using logical connections to one or more remote computers, such as a remote computer device 1348. By way of example, the remote computer device 1348 can be a personal computer, portable computer, a server, a router, a network computer, a peer device or other common network node, game console, and the like. The remote computer device 1348 is illustrated as a portable computer that can include many or all of the elements and features described herein relative to the computer 1302.

Logical connections between the computer 1302 and the remote computer device 1348 are depicted as a local area network (LAN) 1350 and a general wide area network (WAN) 1352. Such networking environments are commonplace in offices, enterprise-wide computer networks, intranets, and the Internet.

When implemented in a LAN networking environment, the computer 1302 is connected to a local network 1350 via a network interface or adapter 1354. When implemented in a WAN networking environment, the computer 1302 typically includes a modem 1356 or other means for establishing communications over the wide network 1352. The modem 1356, which can be internal or external to the computer 1302, can be connected to the system bus 1308 via the input/output interfaces 1340 or other appropriate mechanisms. It is to be appreciated that the illustrated network connections are exemplary and that other means of establishing communication link(s) between the computers 1302 and 1348 can be employed.

In a networked environment, such as that illustrated with the computer environment 102, program modules depicted relative to the computer 1302, or portions thereof, may be stored in a remote memory storage device. By way of example, remote application programs 1358 reside on a memory device of the remote computer 1348. For purposes of illustration, application programs and other executable program components such as the operating system are illustrated herein as discrete blocks, although it is recognized that such programs and components reside at various times in different storage components of the computer 1302, and are executed by the data processor(s) of the computer 1302. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects, components, control node data structures, etc. that perform particular tasks or implement particular abstract data types. Typically, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared, and other wireless media. Combinations of any of the above are also included within the scope of computer readable media.

Although the systems, processes, and scenarios have been described in language specific to structural features of the DIMS 100 and/or performing processes associated with the DIMS 100, it is to be understood that the invention defined in the appended claims is not necessarily limited to the specific features or steps described. Rather, the specific features and steps are disclosed as preferred forms of implementing the claimed invention.

The invention claimed is:

1. An apparatus comprising:
   a stand-alone computer, outside of a domain defined by a plurality of clients, the stand-alone computer including:
     a lifecycle manager for managing digital ID lifecycles for application programs, and
     an abstraction layer portion for abstracting digital IDs associated with the application programs as abstracted digital IDs, wherein trusted data is not included with the abstracted digital IDs provided from the application programs, and the abstraction layer portion providing common storage, retrieval, and management of the abstracted digital IDs associated with the application programs through a digital identity management system (DIMS) and a common Application Programming Interface (API) layer; and
   the lifecycle manager and the abstraction layer portion on the stand-alone computer forming at least a part of a trust model.

2. The apparatus of claim 1, wherein the DIMS is configured as a simple trust that applies to home users that are not connected to any managed services.

3. The apparatus of claim 1, wherein the DIMS is configured as an enterprise trust that applies to a corporate or business user operating a computer that belongs to an active directory environment.

4. The apparatus of claim 1, wherein the DIMS causes the application program to perform an authentication process using digital IDs.

5. The apparatus of claim 1, wherein the DIMS can provide lifecycle management for digital IDs without user interaction or application program interaction.

6. The apparatus of claim 1, wherein the DIMS relies on local policies to define lifecycle management criteria.

7. The apparatus of claim 1, wherein the DIMS relies on central policies to define lifecycle management criteria.

8. The apparatus of claim 1, wherein the DIMS interacts with a central service to obtain a digital ID.

9. The apparatus of claim 1, wherein the DIMS includes an underlying trust store structure, and wherein the digital IDs associated with the application programs are abstracted from an underlying trust store structure.

10. The apparatus of claim 1, wherein the abstracted digital IDs associated with the application programs indicate where the digital IDs originated so that the DIMS can manage the digital IDs on behalf of the application programs.

11. A Digital Identity Management System (DIMS) that is at least partially contained within a stand-alone computer, outside of a domain defined by a plurality of clients, the DIMS performing operations comprising:
   managing digital ID lifecycles for application programs running within the stand-alone computer; and
   abstracting digital identities (IDs) associated with the application programs, wherein trusted data is not included with the abstracted digital IDs provided from the application programs, for multiple types of digital IDs through a common security token service (STS) and application programming interface (API) layer.

12. The DIMS of claim 11, wherein the digital IDs associated with the application programs are abstracted at least partially using an Application Programming Interface (API) that includes the API layer.

13. The DIMS of claim 11, wherein identity management includes credential management.

14. A digital identity management system (DIMS) comprising:
   a stand-alone computer outside of a domain defined by a plurality of clients, the stand-alone computer including:
     a management lifecycle portion for managing digital ID lifecycles for application programs; and
     an abstraction layer for abstracting digital IDs associated with the application programs, wherein trusted data is not included with the abstracted digital IDs provided from the application programs, and the abstraction layer portion providing common storage and retrieval of multiple types of credentials through a common security token service (STS) and Application Programming Interface (API) layer.

15. The DIMS of claim 14, wherein the DIMS can manage licenses for a user or application program for a digital rights management (DRM) system.

16. The DIMS of claim 14, wherein the DIMS can manage digital ID lifecycles without user interaction.

17. The DIMS of claim 14, wherein the DIMS can manage digital ID lifecycles without application program interaction.

18. The DIMS of claim 14, wherein the DIMS relies on central services to manage digital ID lifecycles.

19. The DIMS of claim 14, wherein the DIMS relies on local services to manage digital ID lifecycles.

* * * * *